United States Patent [19]

Wakai et al.

[11] Patent Number: 4,908,710

[45] Date of Patent: Mar. 13, 1990

[54] METHOD FOR DRIVING A LIQUID CRYSTAL DISPLAY DEVICE

[75] Inventors: Yoichi Wakai; Hiroyuki Baba, both of Suwa, Japan

[73] Assignee: Seiko Epson Corporation, Tokyo, Japan

[21] Appl. No.: 193,448

[22] Filed: May 12, 1988

[30] Foreign Application Priority Data

| May 12, 1987 | [JP] | Japan | 62-115417 |
| Jul. 21, 1987 | [JP] | Japan | 62-181332 |
| May 21, 1987 | [JP] | Japan | 62-124919 |
| Sep. 30, 1987 | [JP] | Japan | 62-247461 |

[51] Int. Cl.⁴ .............................................. H04N 7/01
[52] U.S. Cl. .................................... 358/236; 340/784; 340/799
[58] Field of Search ................... 358/236, 56, 59; 340/765, 784, 799, 802

[56] References Cited

U.S. PATENT DOCUMENTS

| 4,745,485 | 5/1988 | Iwasaki | 358/236 |
| 4,769,713 | 9/1988 | Yasui | 358/236 |
| 4,789,899 | 12/1988 | Takahashi et al. | 358/236 |
| 4,792,857 | 12/1988 | Akiyama | 340/784 X |
| 4,816,816 | 3/1989 | Usui | 340/784 |

FOREIGN PATENT DOCUMENTS

| 0018856 | 5/1980 | European Pat. Off. |
| 3625932 | 2/1987 | Fed. Rep. of Germany |
| 2178922 | 2/1987 | United Kingdom |

Primary Examiner—James J. Groody
Assistant Examiner—Mark R. Powell
Attorney, Agent, or Firm—Blum Kaplan

[57] ABSTRACT

A video display for a liquid crystal display and a method for displaying a complex video signal thereon is provided. A line memory stores one line of video data of a complex video signal. A field memory stores one field of video data of the complex video signal. A signal driving circuit generates a signal driving signal in response to the video data stored in the line memory and the field memory. A multiplexer selectively transmits the video date from the line memory and field memory to the signal driving circuit. One horizontal period of the video signal is sequentially written in the line memory. During the first half of the horizontal period of the video signal, video data of the previous field which is stored in the field memory is transferred to the signal driving circuit. During the second half of the horizontal period, the video data stored in the line memory is transferred to the signal driving circuit. The signal driving circuit generates scanning driving signals for the liquid crystal display, each signal being divided into an odd and even field.

26 Claims, 19 Drawing Sheets

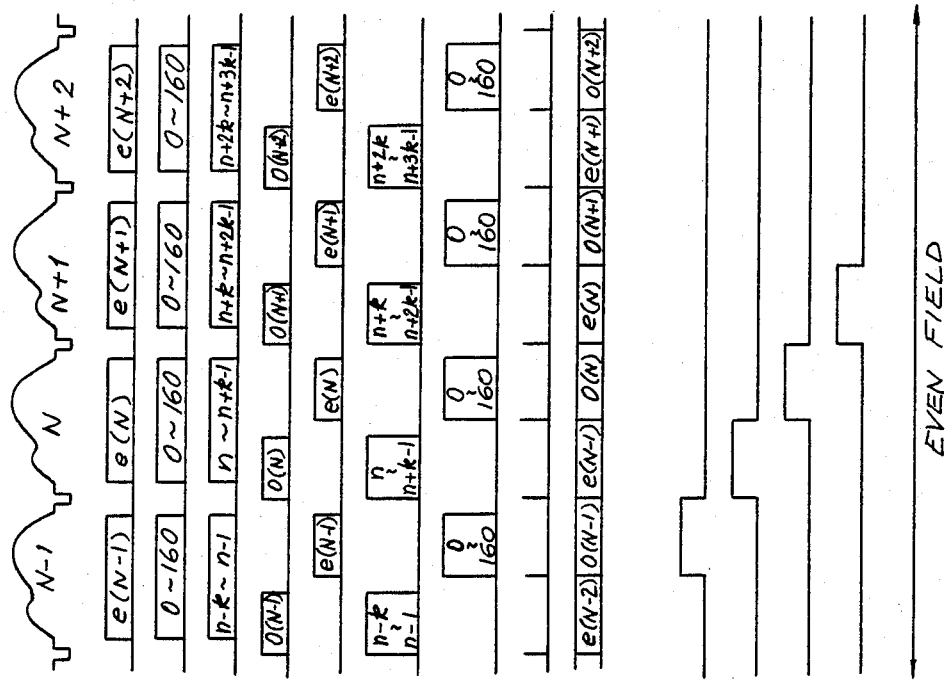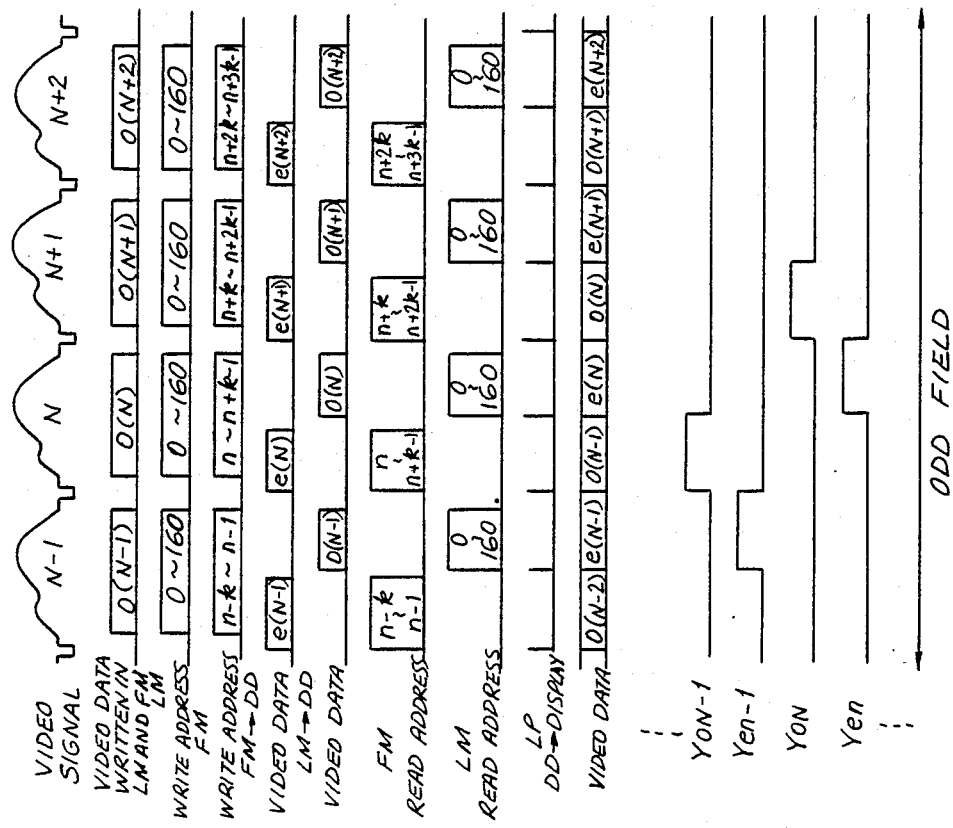
FIG. 16

METHOD FOR DRIVING A LIQUID CRYSTAL DISPLAY DEVICE

BACKGROUND OF THE INVENTION

This invention relates to a video display method for a video display device having a liquid crystal display, and in particular, to a video display method for a television using video signals produced by the interlace method in which the display is divided into an even field and an odd field during transfer of the video signals.

Conventional video display apparatus utilizing a liquid crystal display are small in size. In the conventional liquid crystal display, such as a liquid crystal television, video signals are transferred so that video signals of two adjacent scanning lines within a video field are divided into an even portion and an odd portion. Both portions are displayed on the same line of the television display due to the small size of the liquid crystal television display. In the conventional liquid crystal television, the number of scanning lines contained within the display is about 220 to 240 lines and the degree of resolution in the longitudinal direction across the screen is about one half of that of an ordinary television. Additionally, since all the scanning lines are scanned by a single field, the frequency for replacing data on the display is 60 Hz so that the display hardly exhibits flickering even when a liquid crystal display is utilized.

The small size liquid crystal video display has been satisfactory, however, the small size display suffers from lack of image quality and an inferior degree of resolution. Accordingly, large size liquid crystal video displays have been developed and various prototypes are known in the art. The larger the display the greater the number of picture elements required for that display. For example, in the convention large crystal displays, the number of scanning lines of the larger size liquid crystal display is from 440 to 480, twice as many as the number of scanning lines in the smaller size liquid crystal display described above.

The large size liquid crystal display suffers from the problem that when the liquid crystal display is driven in accordance with the interlace method as is done with a conventional television, the frequency for replacing data in the display is 30 Hz which results in flickering on the display. Therefore, it becomes necessary to scan the lines of an entire field through the non-interlace driving method so that the scanning speed is doubled and the frequency for replacing data on the display becomes 60 Hz limiting flickering. In the conventional large size liquid crystal display, the non-interlace driving method is utilized so that the video signals produced during a single horizontal signal period are displayed twice on two adjacent lines utilizing a line memory for storing the video signal during the period of a single horizontal signal. However, the conventional non-interlace driving method is unsatisfactory in that the same video data is displayed on two adjacent lines and therefore makes it difficult to take advantage of the larger display and improve the degree of vertical resolution. Accordingly, it is desirable to provide a video method display which overcomes the shortcomings of the prior art method described above.

SUMMARY OF THE INVENTION

Generally speaking, in accordance with the invention, a video display method for utilizing an interlace video signal by dividing the signal into odd and even fields to be transferred to the video display is provided. A video display has a line memory for storing one line of video data and a field memory for storing one field of video data. A signal driving circuit provides a driving signal to the video display in response to an input from either the line memory or field memory. A scanning driving circuit generates scanning driving signals for the display. During the period of the horizontal term of the video signal, video data is sequentially written in the line memory. During the first half of the horizontal period, the video data stored in the field memory during the previous horizontal signal period is transferred to the signal driving circuit. The video field data is stored in a predetermined region of the field memory both before and after the horizontal signal period. During the second half of the horizontal signal period the video data which is stored in the line memory is transferred to the signal driving circuit.

The scanning driving signals corresponding to the odd field are generated in a line by line fashion in alternating order of even lines and odd lines beginning with an even line. The scanning driving signals corresponding to the even field are generated in sequential line by line alternating order beginning with the odd line of the display.

During the second half of the horizontal signal period, the video data stored in the line memory is transferred to the predetermined region of the field memory. The transfer of the video data stored in the predetermined region of the field memory to the signal driving circuit always precedes the operation of transferring the video data from the line memory into the predetermined region of the field memory.

The video data provided during one horizontal period may be divided into a plurality of groups. The line memory and/or field memory is also divided into a plurality of blocks corresponding to the groups of the video data. Each individual block is connected in series when the video data is written in the line memory and field memory. The video data is read from the individual blocks in parallel.

A complex video signal comprising a simultaneous signal and a video signal has a period represented as Tc. The video signal has a period Tv and the period of the complex video signal is always greater than the period of a video signal. The display is composed of a number of picture elements B, along the horizontal direction. Writing of the video data of video signal Tv into the line memory or field memory is performed every $Tv/B$. Reading of the video data during one period of the video signal, Tv, from the line memory or field memory is performed every $Tc/2C$ wherein C is a positive integer greater than or equal to B and $Tc/2C$ is greater than $Tv/2B$.

It is an object of this invention to provide an improved video display method.

Another object of this invention is to provide a noninterlace driving video display method for a liquid crystal display which utilizes the line memory for storing video signals of one field, displaying video signals of both the previous field data and the present field data during the period for the field and displaying different video signals in each of the scanning lines of the display.

Another object of the present invention is to provide a video display method for a liquid crystal display which utilizes noninterlace driving display signals and allows improved vertical resolution.

A further object of the present invention is to provide a video display and method which reduces power consumption.

Yet another object of this invention is to provide a display method which expands the design margin of the display system.

Still another object of this invention is to provide a noninterlace driving video display method which is able to make use of more effective memory structures.

Still other objects and advantages of the invention will in part be obvious and will in part be apparent from the specification.

The invention accordingly comprises the several steps and the relation of one or more of such steps with respect to each of the others thereof, which will be exemplified in the method hereinafter disclosed, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 16 is a timing chart for the scanning driving circuit of FIG. 14;

DETAILED DESCRIPTION OF THE PREFERRED EMBODIMENT

Figure 1:
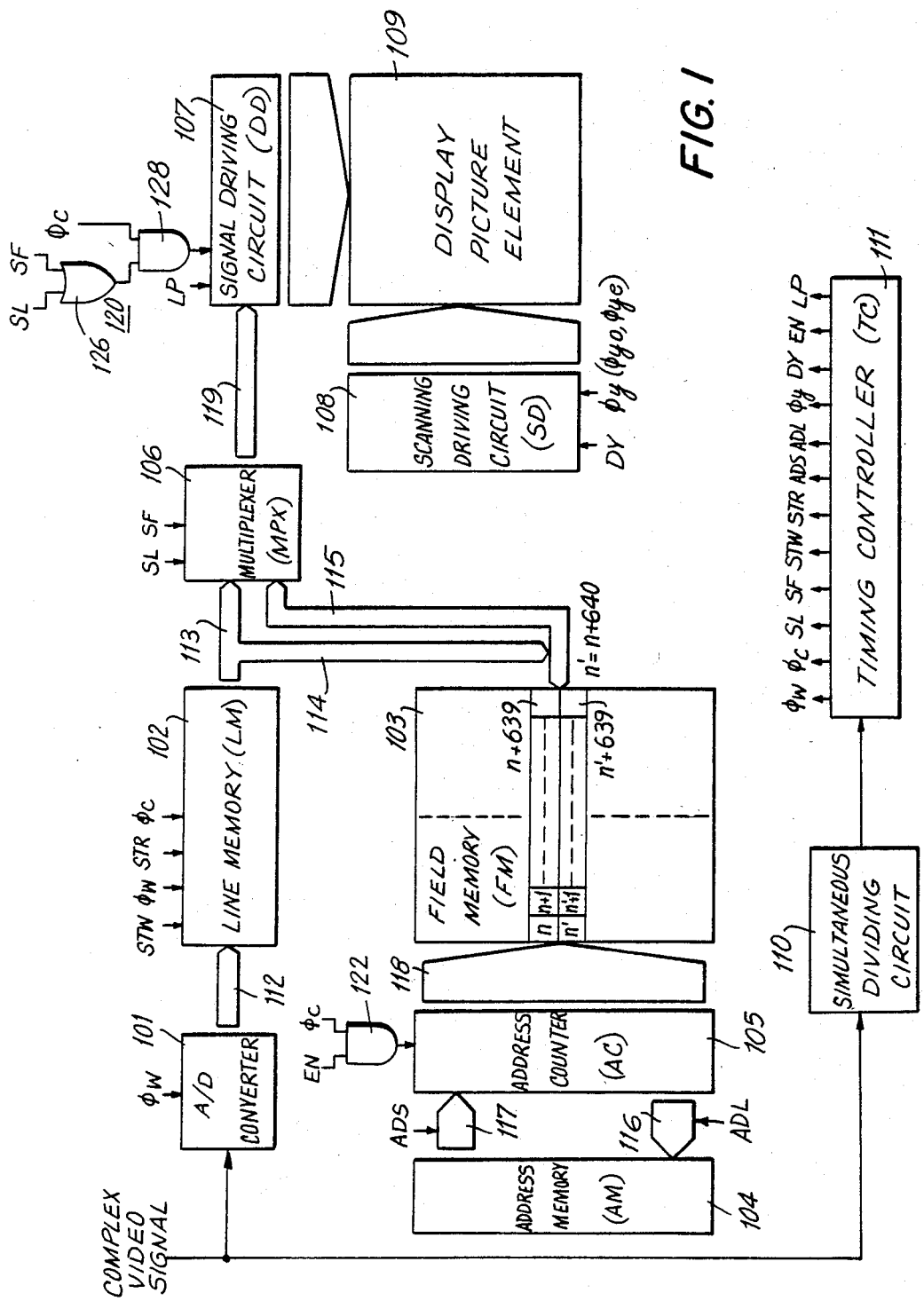
FIG. 1 is a block diagram of a video display system constructed in accordance with the invention.

Reference is made to FIG. 1 wherein a block diagram of a video display system in accordance with the invention is depicted. An analog to digital (A/D) converter 101 receives a complex analog video signal and clock signals $\phi_W$. Analog to digital converter 101 converts the analog complex video signal to a digital signal. In an exemplary embodiment, the video signal may be divided into 16 gradations so the digitized video signal is composed of four bit segments of video data. The digitized data is transferred to a line memory (LM) 102 through a data bus 112.

LM 102 is a first in first out memory which stores the video data corresponding to one period or term of the horizontal signal (1H). In first in-first out memories, reading out of the stored data and writing in data are individually performed as separate functions. LM 102 receives clock signals $\phi_W$ and a signal to start writing data STW. The video data corresponding to 1H is written sequentially in LM 102 in addresses located within LM 102 as controlled by clock signal $\phi_W$. LM 102 receives a second clock signal $\phi_C$ and a read start signal STR. Signal STR causes LM 102 to begin reading out the 1H of data from each of the addresses as controlled by clock signal $\phi_C$. Video data read out of LM 102 is transferred to a mutliplexer (MPX) 106 and a field memory (FM) 103 through respective data buses 113, 114.

Figure 2:
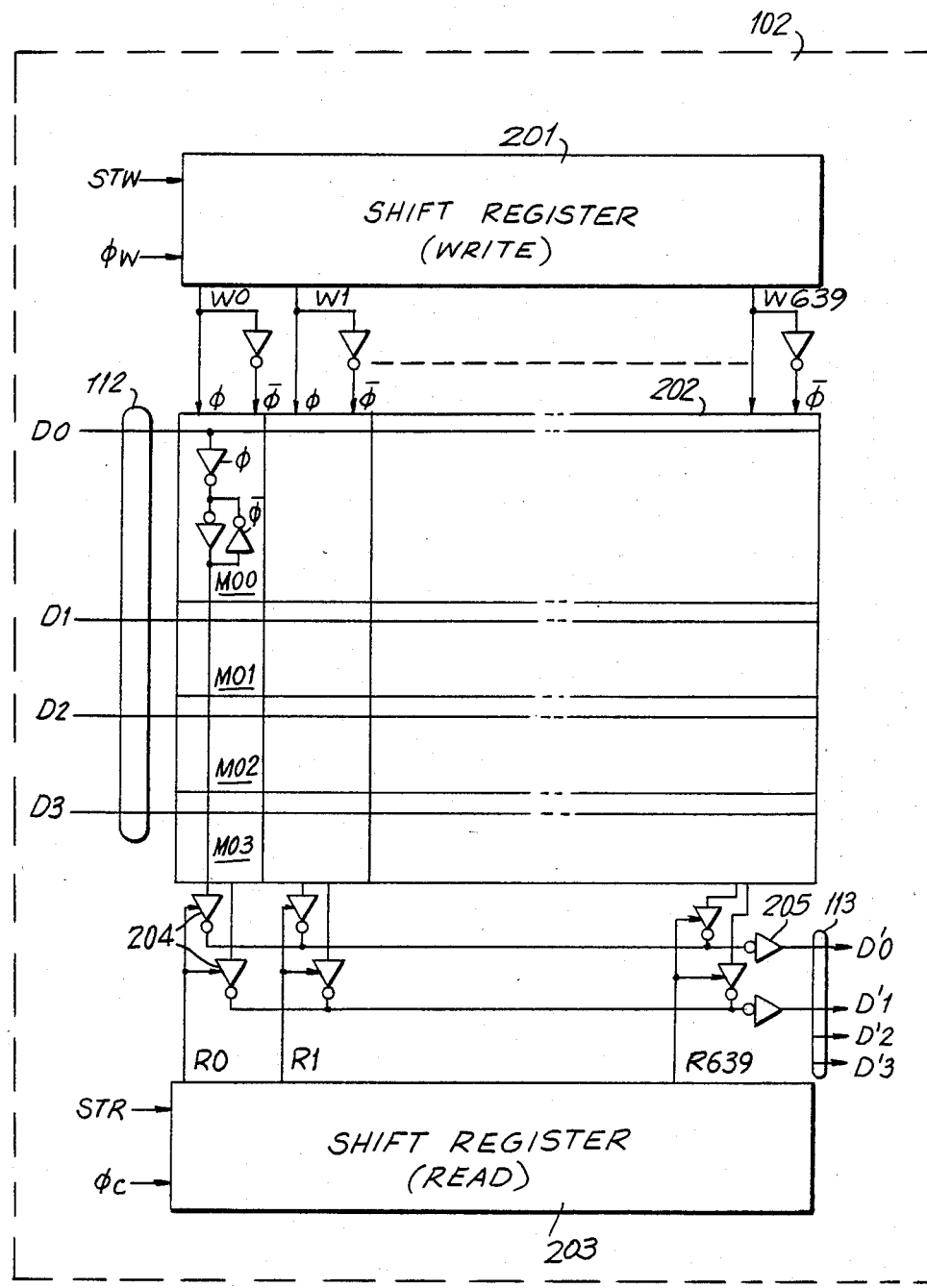
FIG. 2 is a block diagram of the line memory of FIG. 1.

Reference is now made to FIG. 2 wherein LM 102 is shown in greater detail. A shift register 201 receives signals STW and $\phi_W$ and designates the address for writing the video data within LM 102. Shift register 201 begins operation upon receipt of start write signal STW and shifts the data to each respective address within LM 102 in accordance with clock signals $\phi_W$. This process occurs sequentially for each of the addresses within LM 102. As each address is sequentially designated, the output of each respective column W0, W1, . . . , W639 of shift register 201 has a value of "1". A storage portion 202 receives the video data through bus 112. Each video data word has four bits D0–D3. Storage portion 202 has a capacity of six hundred and forty words. Each word D0–D3 is input to a four bit latch clock M00–M03 respectively. Latch clocks M00–M03 also receive the outputs of columns W0, W1, . . . , W639 so that when the output of each of columns W0, W1, . . . , W639 become "1", the bits D0–D3 of the corresponding video data words are written in respective latch clocks M00–M03 of that column.

A shift register 203 designates the address for reading out the data stored within LM 102. Data is transmitted from storage portion 202 to shift register 203 through a plurality of clocked gates 204 providing an output R0, R1, . . . , R639 corresponding to each column of shift register 203. Shift register 203 begins operation upon receipt of the read start data signal STR and shifts the addresses of the stored information in accordance with a clock signal $\phi_C$. As the addresses are shifted, the outputs R0, R1, . . . , R639 successively become a value of "1". Corresponding clock gates 204 are commonly connected to another clock gate 205 at the output of each bit $D'_0$–$D'_3$ having the same weight with respect to each of the individual words input at bus 112. Each word stored in storage circuit 202 is then read out in the order in which they were written and the words made up of video data bits $D'_0$–$D'_3$ are output to MPX 106 and FM 103 along data buses 113, 114.

FM 103 has a storage capacity for a field of video signals being 1H in size. The video data of an optional H is carried between the address n and (n+639). As will be described in greater detail below, a video display 109 of the video display system has six hundred and forty video elements extending in the horizontal direction. A 1H video signal is a video signal having a period or term which may be divided so that the total number of sections of the signal, B, is equivalent to six hundred and forty. The video data of the next succeeding H signal is carried between the addresses and n' and (n+639) of FM 103, wherein n' is equal to n+six hundred and forty. Video data is fed to FM 103 through data buses 114, 115. When video data is written in FM 103, the 1H video data is transferred from LM 102 to FM 103 through data bus 114.

An address counter (AC) 105 designates the addresses for storing the 1H video signals within FM 103. AC 105 receives a data address shifting signal from an AND gate 122. Gate 122 receives cock signal $\phi_C$ and a control signal EN which controls the supply of clock signal $\phi_C$ to AC 105. When EN is "1", clock signal $\phi_C$ is supplied to AC 105, thereby changing the counter code and the addresses contained within AC 105. The counter code of AC 105 is transferred to FM 103 through an address bus 118, thereby designating the predetermined addresses within FM 103.

An address memory (AM) 104 temporarily stores an address code of AC 105. The address code of AC 105 is latched by ADL signals transmitted to AM 104 through an address bus 116. The address code stored in AM 104 is later sent back to AC 105 through ADS signals through an address bus 117.

MPX 106 receives video signals from both LM 102 and FM 103 and selectively controls whether the video signal output from either LM 102 or FM 103 is transferred to a signal driving circuit (DD) 107. MPX 106 receives a first control signal SL and a second control signal SF through OR gate 126, the output of which is applied to DD 107 through AND gate 128, which is clocked by clock signal $\phi_C$. When SL has a value of "1", the video signal from LM 102 is transferred to DD 107. When SF has a value of "1" the video signal from FM 103 is transferred to DD 107. The video signal from MPX 106 is transferred to DD 107 through a data bus 119.

DD 107 receives the video signals from MPX 106 and generates signal driving signals in accordance with the received video signals for application to display 109 in a column by column manner. DD 107 is controlled by gated signals output from a gate 120 and control signal LP. Gate 120 includes a OR gate 126 and AND gate 128. The output of gate 120 is the output of gate 128. Since display 109 has six hundred and forty picture elements in a horizontal line, there are six hundred and forty corresponding output terminals from DD 107, each connected to one of the six hundred and forty columns of display 109.

Figure 3:
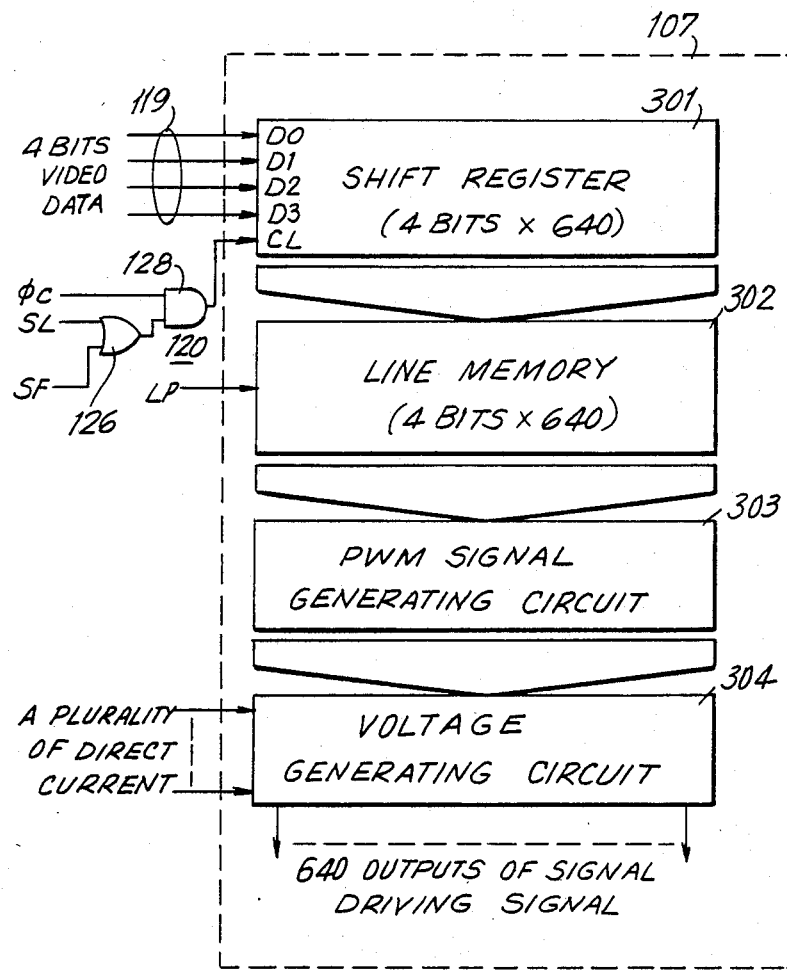
FIG. 3 is a block diagram of the signal driving circuit in accordance with the invention.

As is seen in FIG. 3, DD 107 includes a shift register 301 having the capacity to process a word for each column, for a total of four bits by six hundred and forty columns. Shift register 301 receives the output of gate 120 and when either SL or SF has a value of "1", the clock signal $\phi_C$ is input as a shift clock into shift register 301. The video data is then transferred to shift register 301 at inputs D'0–D'3. As each word corresponds to four bits, line memory 302 has a line memory capacity of four bits by six hundred and forty words. Each word is arranged within line memory 302 to correspond to the correspondingly numbered column of shift register 301. In this manner the video data carried in shift register 301 is transferred in a known fashion to line memory 302. Line memory 302 is controlled by a control signal LP. The video data contained within line memory 302 is refreshed each period of LP. A PWM signal generator 303 generates PWM signals in accordance with the weight or gradation of the video data of each word stored in line memory 302. The video signals stored in line memory 302 consist of four bit sections. A voltage generating circuit 304 receives the PWM signals and a plurality of direct current inputs and produces six hundred and forty signal driving signals by selecting the particular voltage based upon either the "1" or "0" value of the corresponding PWM signals.

DD 107 converts the serial input of the video signal into a parallel output, thereby generating circuit driving signals forming a line. Such a circuit may be a monolithic integrated circuit chip such as CMOSIC "MSM 5300" manufactured by Oki Electric Industry Co., Ltd.

Figure 4:
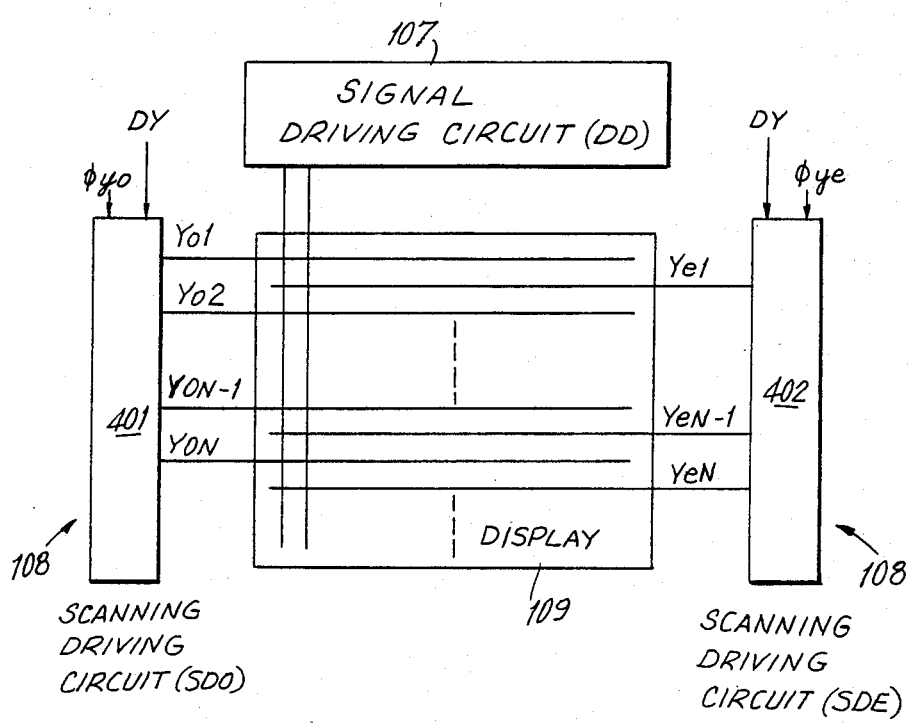
FIG. 4 is a block diagram of the scanning driving circuit in accordance with the invention.
Figure 5:
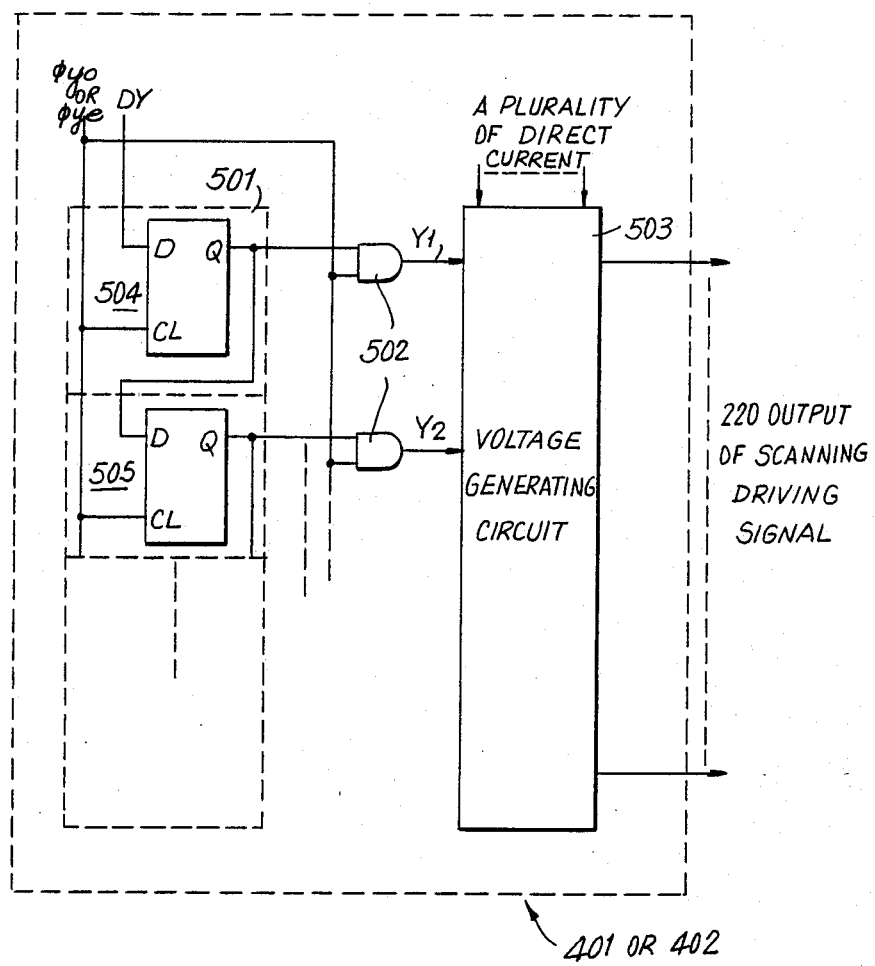
FIG. 5 is a block diagram of the scanning driving circuit of FIG. 4.

A scanning driving circuit (SD) 108 generates scanning driving signals in the vertical direction, i.e., down each column. SD 108, as shown in detail in FIGS. 4 and 5, is divided into a scanning driving circuit (SDO) 401 for driving the odd lines of display 109 and a scanning driving circuit (SDE) 402 for driving the even lines of display 109. Each scanning driving circuit 401, 402 includes a shift register 501 (FIG. 5) corresponding to two hundred and twenty columns. Each column of shift register 501 is formed of a flip flop 504, 505, . . . An output Q of the flip flop for each column provides an input to the input D of each successive flip flop of each successive column. The flip flop of column 503 receives as an input D a shift data signal DY. The clock input CL of each flip flop 504, 505, . . . , for switching the columns, receives a shift clock signal $\phi_{YO}$ for odd scanning or $\phi_{YE}$ for even scanning. AND gates 502 each receives the Q outputs the flip flop 504, 505, . . . of each column and the clock signal $\phi_{YO}$ or $\phi_{YE}$. A voltage generating circuit 503 receives a plurality of direct current inputs and the outputs of AND gates 502, and produces two hundred and twenty scanning driving signals in accordance with the respective "1" or "0" values output by AND gates 502. Both SDO 401 and SDE 402 output two hundred and twenty scanning driving signals each so that four hundred and forty lines may be driven. Such a scanning driving signal is presently available, for example, a monolithic integrated chip model No. CMOSIC "MSM 5298" manufactured by Oki Electronic Industry Co., Ltd.

Display 109 is formed of a liquid crystal display having six hundred and forty picture elements in the horizontal or column direction and four hundred and forty picture elements in the vertical or line direction.

A simultaneous dividing circuit 110 (FIG. 1) receives the complex video signal and divides the signal using the amplitude dividing technique. The divided signal is then transmitted to a timing control (TC) 111 which produces all of the timing and controlling signals discussed above. Each of these signals is based upon the divided complex video signal.

Figure 6:
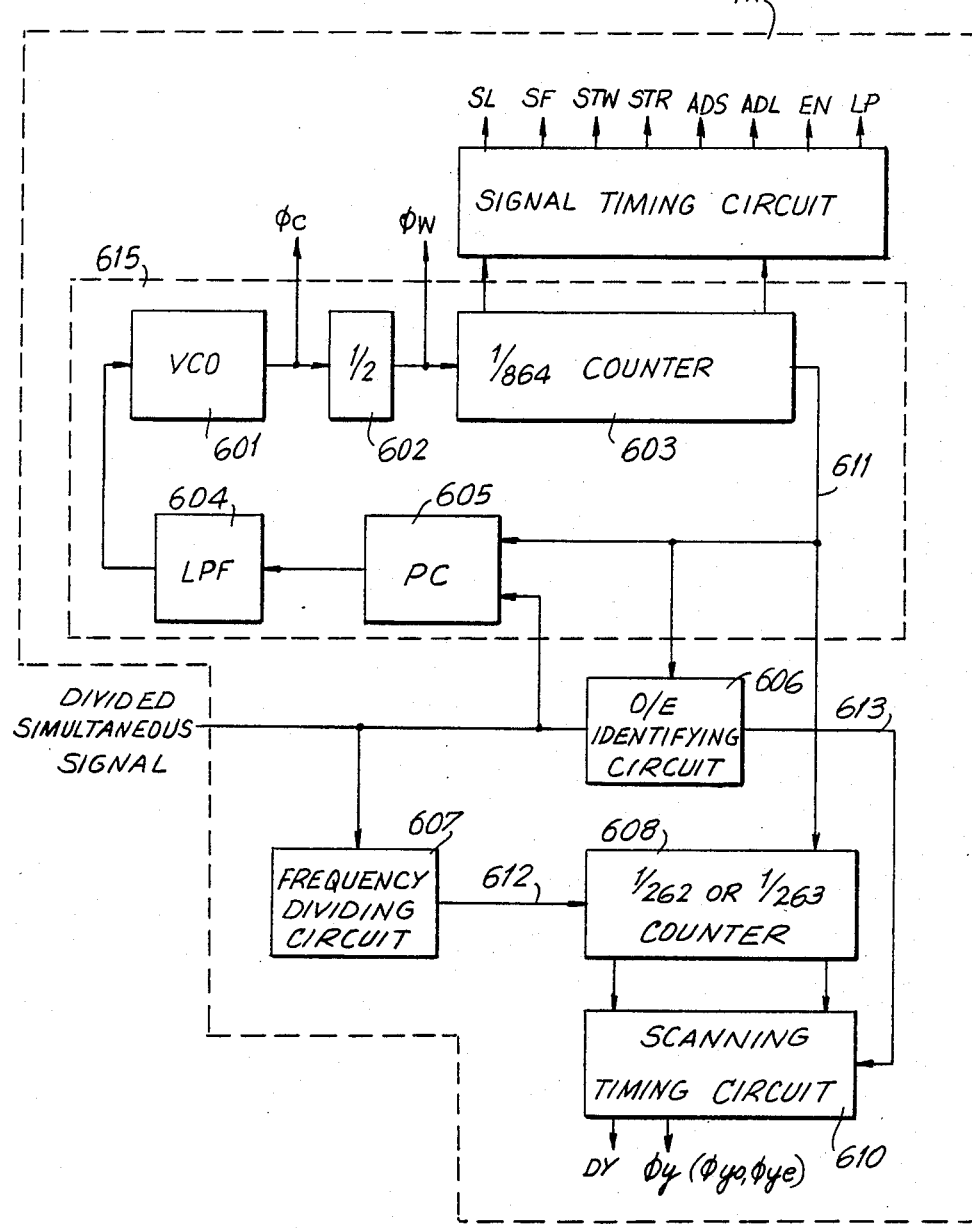
FIG. 6 is a block diagram of a timing controller constructed in accordance with the invention.

Reference is now made to FIG. 6 in which the operation and structure of TC 111 is shown. A phase-lock loop (PLL) 615 includes a voltage controlling oscillator (VCO) 601 which receives a signal from a low pass filter (LPF) 604 and changes the output frequency of VCO 601 in accordance with the phase comparative voltage output from LPF 604. The output of VCO 601 is clock signal $\phi_C$. The output of VCO 601 is then divided in half by a divider 602 producing an output is clock signal $\phi_W$. $\phi_W$ is input into a counter 603 which divides the signal by eight hundred and sixty four producing a signal 611. A phase comparator (PC) 605 receives signal 611 and the divided complex simultaneous signal from simultaneous dividing circuit 110 as inputs, compares their phase and generates a phase comparative signal which is input into LPF 604, completing PLL 615. LPF 604 integrates the phase comparative signals from PC 605, thereby forming the direct voltage for controlling the oscillating frequency of VCO 601.

When PLL 615 is in a stable state, the oscillating frequency fVCO of VCO 601 may be represented as:

$$\begin{aligned} fVCO &= 2 \times 864 \times fH \\ &= 2 \times 864 \times 15734 \text{ Hz} \\ &\approx 27.2 \text{ MHz} \end{aligned}$$

wherein fH stands for the horizontal simultaneous frequency. The video data for 1H corresponds to six hundred and forty picture elements, fVCO in the period in term of 1H corresponds to eight hundred and sixty four picture elements. In the stable state such as in the case of television service of the NTSC.M system, signal 611 has been divided by 864 by counter 603 and the frequency fH is equivalent to 15734 Hz.

A signal timing circuit 609 receives the output of divider 603 and decodes the code of counter 603 to form control signals SL, SF, STW, STR, ADS, ADL, EN and LP.

An odd/even (O/E) identifying circuit 606 receives as one input the divided complex simultaneous signal from simultaneous dividing circuit 110 and signal 611 as another input. A frequency dividing circuit 607 also receives the divided complex simultaneous signal from simultaneous dividing circuit 110 and divides only the vertical simultaneous signals. A counter 608 receives signal 611 as an input and divides signal 611 by two hundred and sixty two or two hundred and sixty three. Counter 608 is reset by vertical simultaneous signal 612 output from frequency dividing circuit 607, thereby counting signal 611. The division rate is switched from two hundred and sixty two to two hundred and sixty three each successive field so that 525H are counted in two successive fields. When PLL 615 is in the stable state, the frequency of 611 is fH and counter 608 is actually counting the horizontal period.

A scanning timing signal 610 receives the odd/even identifying signal 613 from the odd/even identifying circuit 606 as well as the code of counter 608 and forms control signals DY, $\phi_{yo}$ and $\phi_{ye}$ for scanning display 109.

Figure 7:
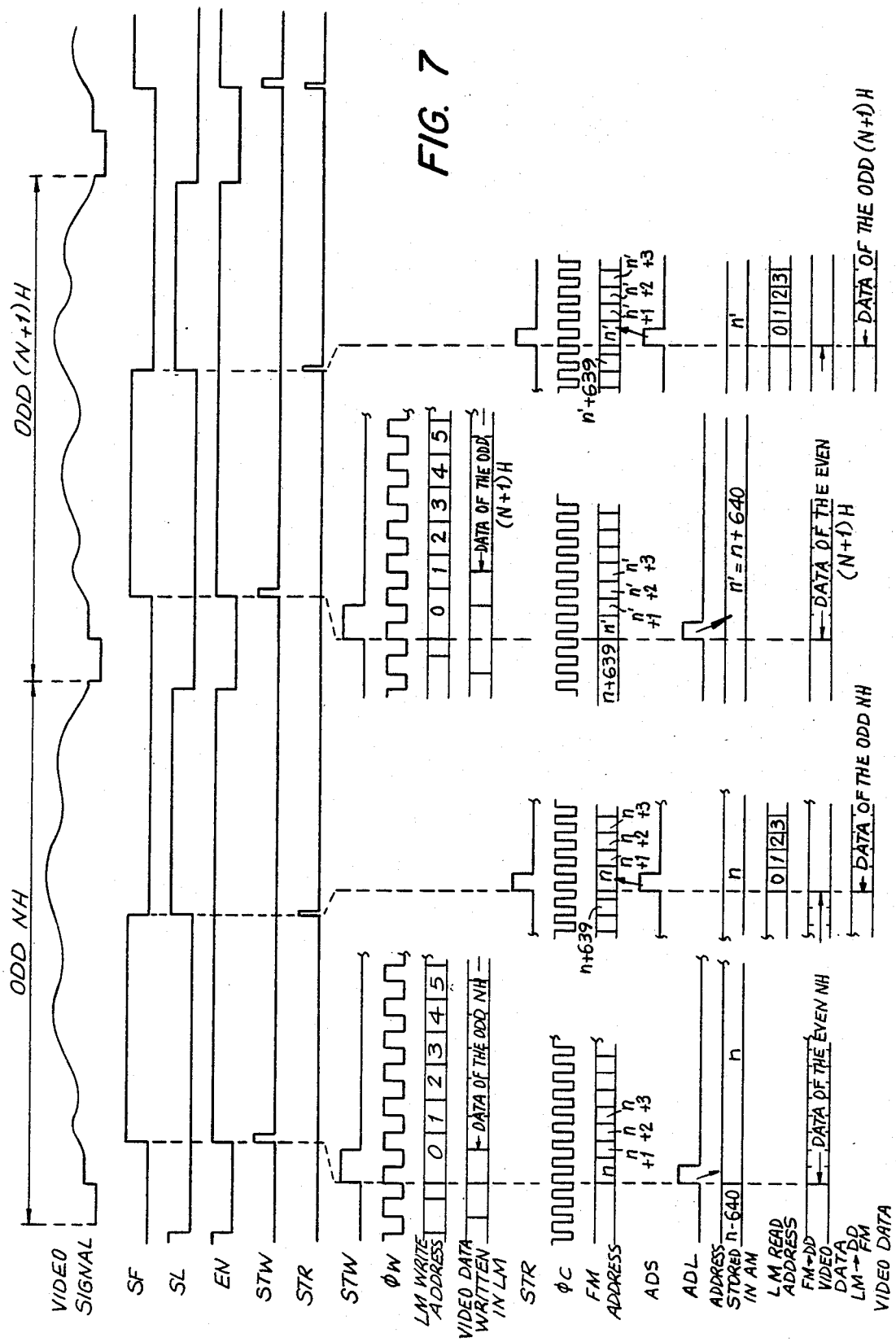
FIG. 7 is a timing chart showing the operation of the video method in accordance with the invention.
Figure 8:
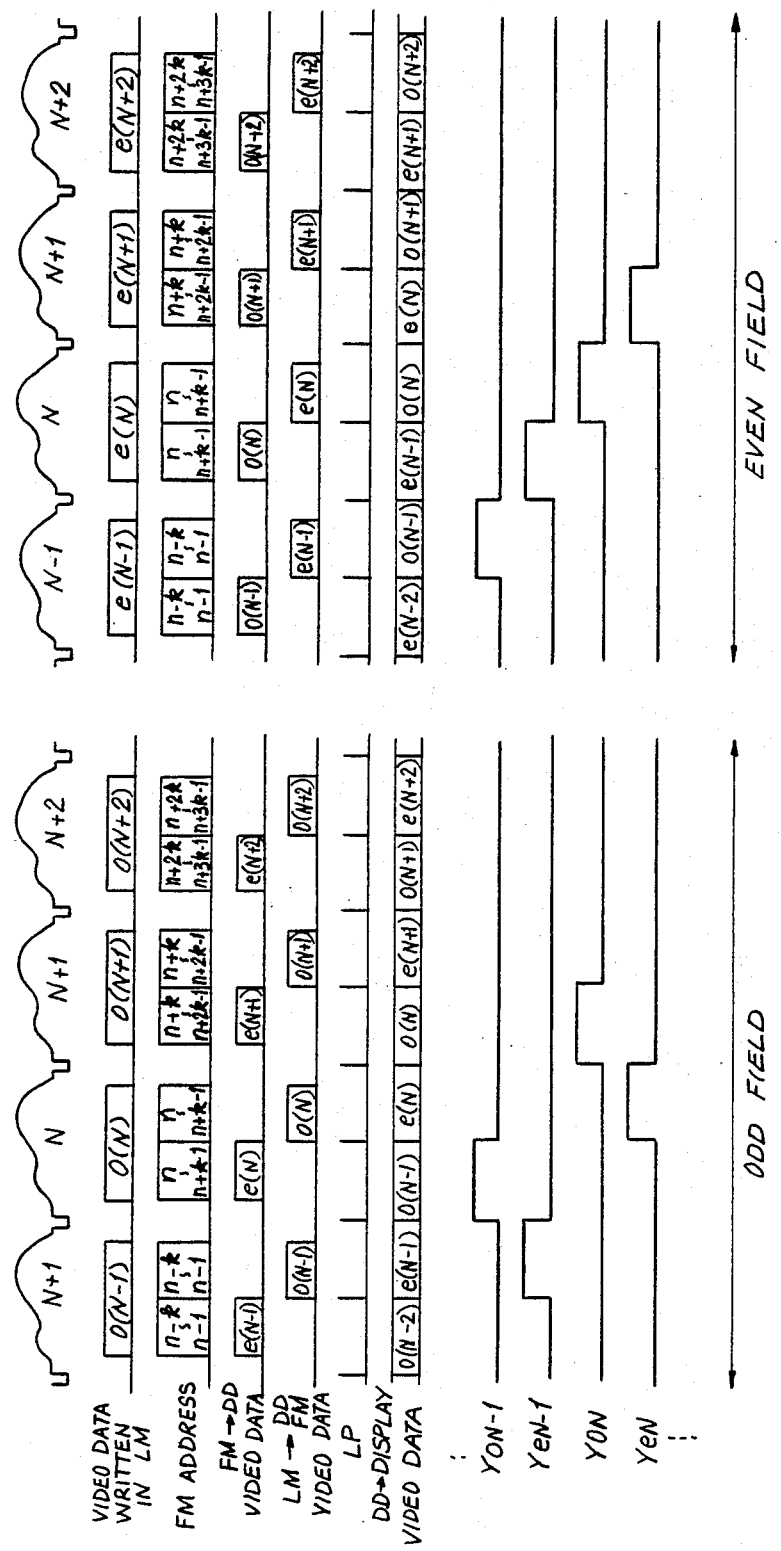
FIG. 8 is a timing chart showing operation of the video system in accordance with the invention.
Figure 9:
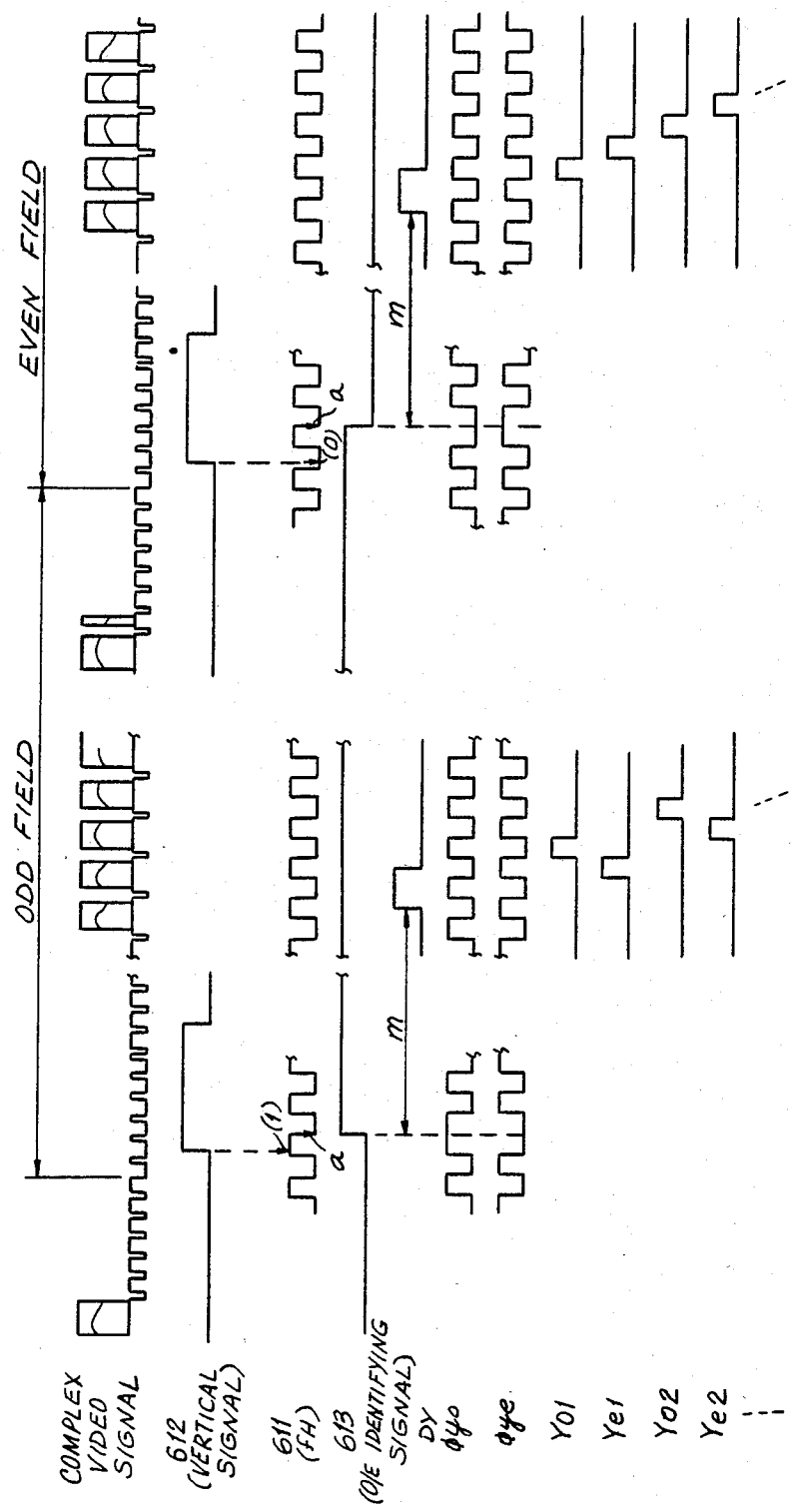
FIG. 9 is a timing chart showing operation of the scanning driving circuit of FIG. 5.

Reference is now made to the timing charts of FIGS. 7-9. FIG. 7 is a timing chart illustrating the behavior of the video display structure and method during the periods or terms H of a first signal NH and a second signal (N+1)H of the odd field. Signal SF becomes "1" during the first half of the horizontal signal period, while SL becomes "1" during the second half of the horizontal period. MPX 106 selects the video data contained in FM 103 when SF is "1", the first half of the horizontal period and selects the video data read out of LM 102 when SL is "1", during the second half of the horizontal period. Accordingly, individual bits of video data are transferred to DD 107. EN has a value of "1" during the horizontal period. When signal EN has a value of "1", clock signal $\phi_C$ is supplied to AC 105. Signal STW has the same period as clock signal $\phi_W$ and rises to a value of "1" simultaneously with SF. Signal STR has the same period as clock signal $\phi_C$ and becomes "1" simultaneously with SL.

The lower half of FIG. 7 shows an enlarged time axis to illustrate that in the odd period NH, shift register 201 which controls the writing of data in LM 102 is started in accordance with signal STW obtaining a value of "1" while the write address of LM 102 changes simultaneously with clock signals $\phi_W$. This causes the video signals of the odd period NH to be progressively written in LM 102. Since EN is equal to "1" during this time, the address of FM 103 contained in AC 105 is being incrementally changed, n, n+1, ..., wherein n stands for a positive integer which increases simultaneously with clock signal $\phi_C$. ADL rises simultaneously with signal EN so that the address "n" of FM 103 contained in AC 105 is set in AM 104. In accordance with the change of address of FM 103 from the changes in AC 105, the video data of an even NH written in between the address n and the address n+639 of FM 103 is transferred to DD 107 when SF becomes "1".

During the second half of odd NH, STR becomes "1" and shift register 203 begins reading out the data stored in LM 102. The read out address of LM 102 changes simultaneously with clock signal $\phi_C$.

The ADS signal rises simultaneously with SL, so that the address "n" stored in AM 104 is set in accordance with the address previously set in AC 105. AC 105 changes the address FM 103 from n to n+639 simultaneous with the clock signal $\phi_C$.

SL has a value of "1" so that video data of odd NH read out of LM 102 is transferred to DD 107 and is simultaneous written in FM 103 through data bus 114. The data of LM 102 is written in FM 103 in progressively increasing addresses n, n+1, .... The frequency of $\phi_C$ is twice that of $\phi_W$ and $\phi_W$ precedes $\phi_C$ so that the writing of data always occurs ahead of the reading of data.

Processing of signals during the odd (N+1)H occurs in the same manner. During the first half of the horizontal period of the odd (N+1)H, SF has a value of "1". The video data of the even (N+1)H written in the addresses n' to n'+639, wherein n' is equivalent to n+six hundred and forty, in FM 103 is transmitted to DD 107. At the same time, the video data of the odd (N+1)H is written in LM 102. Additionally, SL becomes "1" in the second half of the odd (N+1)H and the video data of the odd (N+1)H of LM 102 is transferred to DD 107 and written in the addresses n' to n'+639 of FM 103.

The time chart of FIG. 7 illustrates the odd field, however the timing is equally applicable to the even field of the video data.

Reference is now made to FIG. 8 wherein the timing of the scanning drive signals is provided. In FIG. 8, k=640. During the NH of the odd field, the video data of the odd NH is written in LM 102 over a period of 1H. The individual addresses n to n+k−1, corresponding to n+639, of FM 103 are processed twice, once in the first half of the horizontal period and once in the second half of the horizontal period. The video data of the even NH stored in FM 103 is transferred to DD 107 during the first half of the NH and the video data of the odd NH in LM 102 is transferred to DD 107 and to FM 103 during the second half of NH.

The video data transferred to DD 107 is first introduced in shift register 301 and then input into line memory 302 in accordance with control signals LP. The output of signal driving signals corresponding to each video data signal of the even NH and the odd NH lags by one half during the transfer of each bit of video data through DD 107. Furthermore, in the odd field, because the scanning driving signals are generated in the order of $Y_{en-1}$, $Y_{on-1}$, $Y_{en}$ and $Y_{on}$, display 109 can display a correct image by compensating the video data of the odd field with the video data of the even field which had previously preceded it. Furthermore, because in the even field the scanning driving signals are generated in a sequence $Y_{on-1}Y_{en-1}$, $Y_{on}$ and $Y_{en}$, the display 109 can display a correct image by compensating the video data of the even data with the video data of the odd field which had previously preceded it.

Reference is now made to FIG. 9 wherein a timing signals for SD 108 are illustrated. Vertical signal 612 is formed by dividing the frequency of the vertical simultaneous signals in frequency dividing circuit 607 as shown in FIG. 6. Signal 611 is generated from counter 603 and has a frequency fH equivalent to 15734 Hz when PLL 615 is in the stable state. Signal 611 is simultaneously formed with the video complex signal and therefore has a 50% duty. Signal 613 is the odd/even identifying signal. The kind of field is defined by the level of 611 when the vertical signal 612 has risen. When the level of signal 611 is "1" an odd field is identified and conversely when the level of signal 611 is "0" an even field is identified.

The start signal DY of shift register 501 of SD 108 (FIG. 5) is not generated until m signals 611 have been counted beginning with the first rise of signal 611 occurring after the rise of vertical signal 612. Shift clock signal $\phi_{YO}$ is a signal having the inverse phase of shift clock signal $\phi_{YE}$. When 613 becomes "1", $\phi_{YO}$ has an inverse phase vertical signal 612 and $\phi_{YE}$ has the same phase as vertical signal 612. When signal 613 becomes "0", clock signal $\phi_{YE}$ has the same phase as signal 612 and $\phi_{YO}$ has the inverse phase of signal 612. Additionally, when starting signal DY is transferred in accordance with the $\phi_{YO}$ and $\phi_{YE}$ in shift register 501, the scanning driving signal of the even lines precede those of the odd lines in the odd field and the scanning driving signal of the odd lines precede those of the even lines in the even field.

Figure 10:
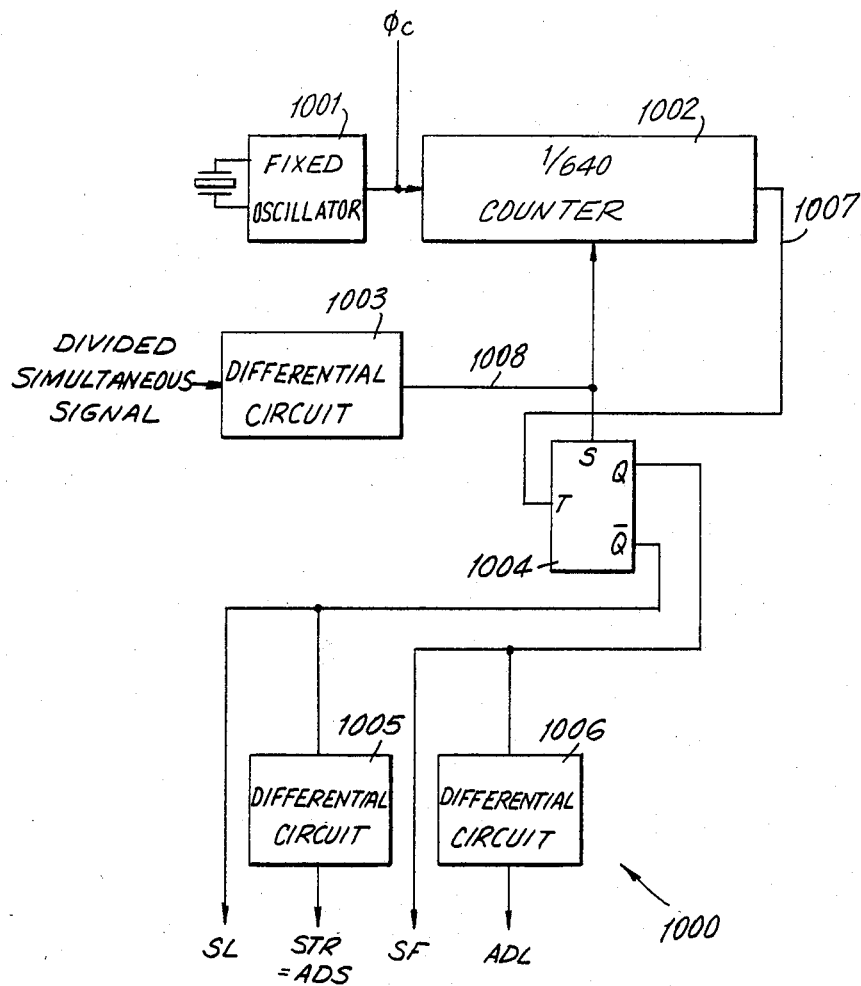
FIG. 10 is a block diagram of a second embodiment of a timing controller in accordance with the invention.

Reference is now made to FIG. 10 wherein an alternate embodiment of a timing controller TCF 1000 is provided. The general operation of the timing controller 1000 is the same as TC 111, however the signals for controlling the reading out of data from video memory LM 102 and FM 103 formed by the timing controller are different.

A fixed oscillator 1001 has a crystal oscillator or the like and produces an oscillating signal $\phi_C$ which acts as a clock signal. Clock signal $\phi_C$ is input into a counter 1002 which counts signal $\phi_C$ six hundred and forty times and provides an output signal 1007. A differential circuit 1003 receives the divided simultaneous signal from simultaneous dividing circuit 110 as an input and generates a differential pulse 1008 which is input to counter 1002 and to a toggle flip flop 1004, which is set by differential pulse 1008 and receives signal 1007 as its T input. Toggle flip flop 1004 divides signal 1007 in half, wherein the output Q is signal SL and the output Q is signal SF. A first differential circuit 1005 differentiates SL, producing STR which is equivalent to ADS. A second differential circuit 1006 differentiates SF and produces ADL. The value of EN is always "1".

Where one period of the complex video signal is Tc, Tc is represented by the equation:

$$Tc = 1/fH = 1/15734$$
$$\approx 63.6 \text{ uS}$$

When a positive integer C is equal to B, which is equal to six hundred and forty, B being the number of picture elements of display 109 existing in the horizontal direction, the oscillating frequency fx is represented by the equation:

$$fx = 2C/Tc = 20.1 \text{ MHz}$$

The output from oscillator 1001, $\phi_C$, is the oscillating frequency fx=20.1 MHz.

Figure 11:
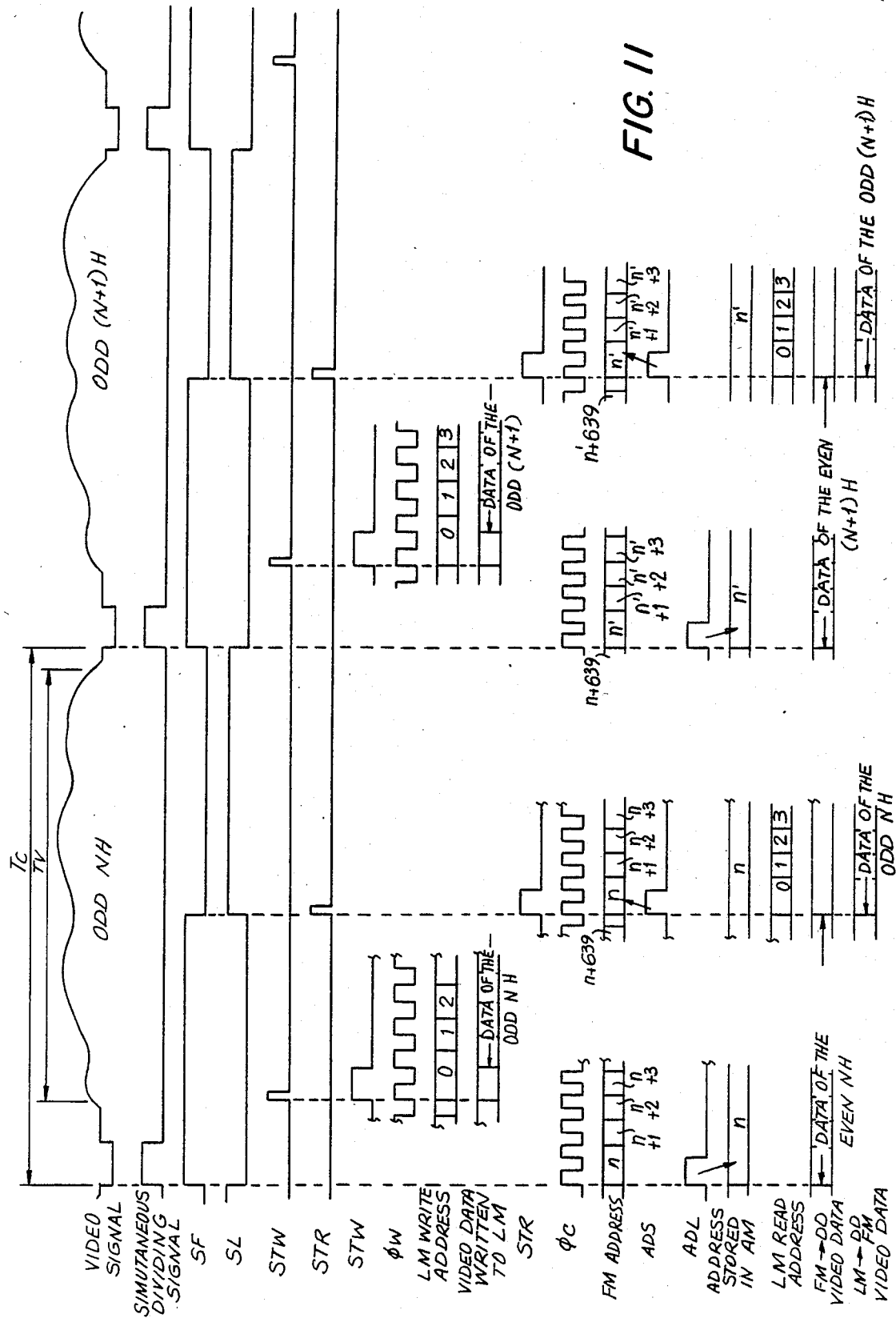
FIG. 11 is a timing chart demonstrating operation of the timing controller of FIG. 10.

Reference is now made to FIG. 11, a timing chart illustrating the production of individual signals by TCF 1000 and the operation of the video display device in response to these signals. FIG. 11 is a timing chart corresponding to the NH and the (N+1)H of the odd field. Again, signal SF becomes "1" during the first half of the horizontal period and SL becomes "1" during the second half of the horizontal period. MPX 106 reads the video data from FM 103 when SF becomes "1" and the video data is read from LM 102 when SL becomes "1". Accordingly, video data is transferred to DD 107.

EN always has a value "1". Therefore, clock signal $\phi_C$ is always supplied to AC 105. Video data is written in LM 102 in the same manner as in the first embodiment. The video data is written in LM 102 when shift register 201 begins operation in accordance with receipt of a signal STW. Video data is written in each word in LM 102 simultaneously with the change of address as controlled by clock signal $\phi_W$. Reading of the data from FM 103 and LM 102 occurs when SF becomes "1" simultaneously with the rising of the divided simultaneous signal. MPX 106 selects the video data from FM 103. The address of FM 103 indicated by AC 105 is changed in accordance with clock signals $\phi_C$. The video data of the even NH, which is stored at an address between n and n+639, is read out from FM 103. Because signal ADL is generated as a derivative of SF, when SF becomes "1", the address "n" in AC 105 is set in AM 104.

After six hundred and forty clock signals $\phi_C$ have been counted starting from Tc/2 at the rise of the simultaneous dividing signal, SF becomes "0" and SL becomes "1". Accordingly, the video data of the odd NH is read from LM 102 in accordance with clock signal $\phi_C$ and is transferred to DD 107. Further, since signal ADS is generated as the derivative of SL, when SL becomes "1", the address "n" of AM 104 is set to AC 105. The video data of the odd NH is transferred from LM 102 to the addresses n through n+639 of FM 103 through data bus 114 and then written in FM 103.

In an identical manner as in the odd (N+1)H, the video data of the even (N+1)H stored in FM 103 at addresses n' to n'+639, where n' is equal to n+640, is transferred to DD 107 during the first half of the horizontal period. The video data of the odd (N+1)H is transferred to DD 107 and FM 103 (in the addresses n' to n'+639) in accordance with the timing of clock signals $\phi_C$.

In this embodiment, because the frequency of clock signal $\phi_C$ is about 20.1 MHz, lower than that of signal $\phi_C$ of the first example which is 27.2 MHz, the total electric power consumption of the system may be reduced. Furthermore, the timing margin of the circuit design may be expanded due to improved access time for reading out the data, writing in the data and transferring the video data.

In this embodiment, C is equal to B. However, if C, which is a positive integer, an be defined so that C is greater than or equal to B, Tc/2C is greater than Tv/2B, wherein B stands for the number of picture elements of display 109 existing in the horizontal direction, Tc is the period of the complex video signal and Tv is the video signal term in Tc. In such an embodiment, the video data can be read out from the video memory with as low a frequency as possible.

Figure 12:
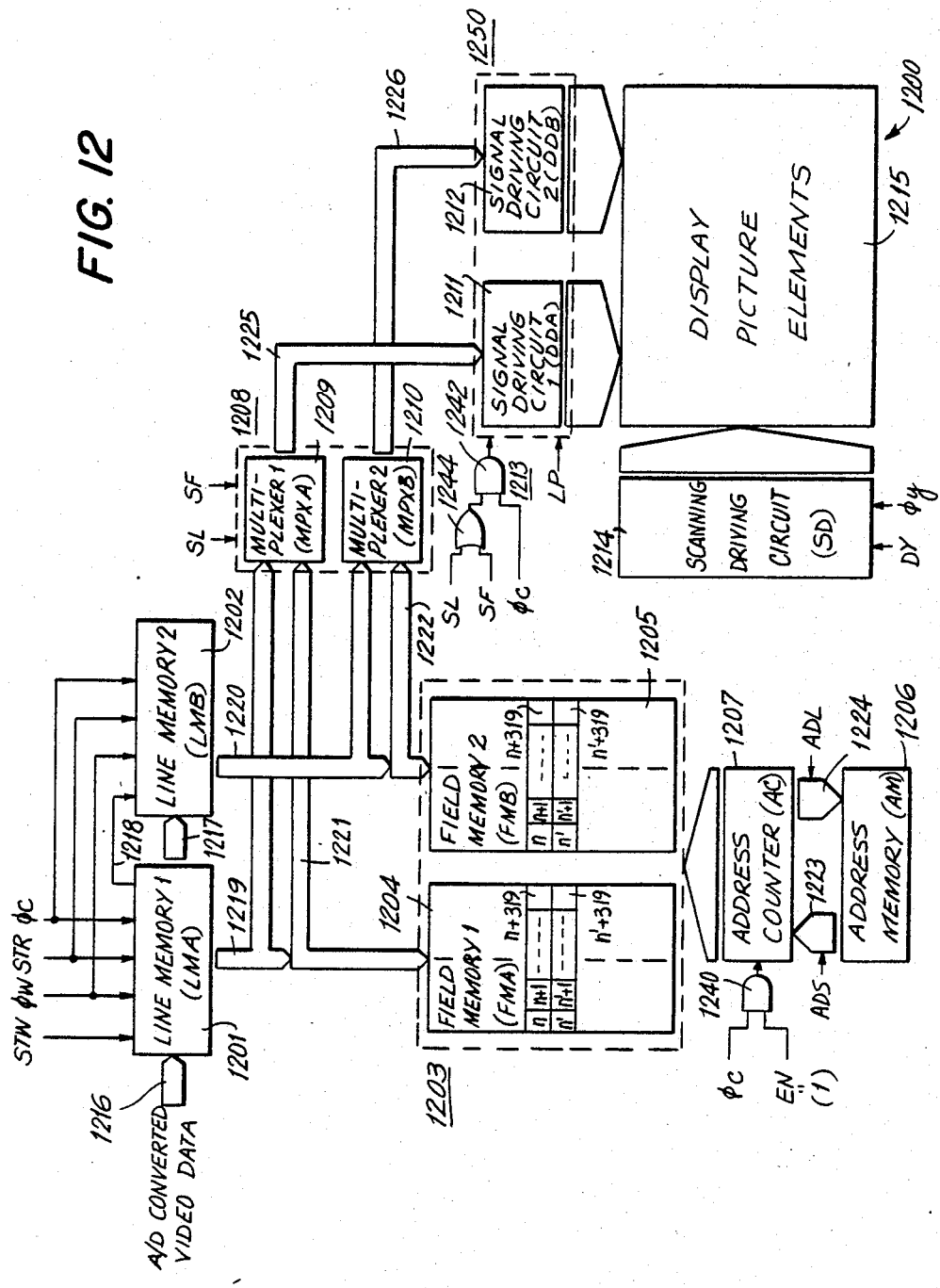
FIG. 12 is a second embodiment of a video display system in accordance with the invention.

Reference is now made to FIG. 12, wherein a second embodiment of the video display apparatus, generally indicated as 1200, is depicted. The video display system 1200 is similar to video display system 100 in operation, however two line memories, LMA 1201, LMB 1202 are provided, MPX 1208 is divided in half between an MPXA 1209 and MPXB 1210, field memory 1203 is divided into an FMA 1204 and FMB 1205, and signal driving circuit 1210 is divided into DDA 1211 and DDB 1212.

Where video data is comprised of words having four bits, each line memory LMA 1201 and LMB 1202 has a capacity of four bits per word by 320 words. LMA 1201 stores the first half of the video data. LMB 1202 stores the second half of the video data. The structure of LMA 1201 and LMB 1202 is the same as LMA 107. The digital converted video data is input into LMA 1201 through a data bus 1216 and then input to LMB 1202 through a data bus 1217. LMA 1201 also receives a signal STW which acts as the shift data signal for the internal shift register and signals the beginning of the writing of video data in LMA 1201. The video data is sequentially written in LMA 1201 in accordance with clock signal $\phi_W$. LMA 1201 outputs a signal 1218 which is the output of the last column of the shift register of LMA 1201. Output 1218 is input to LMB 1202 and becomes the shift data signal of the internal shift register of LMB 1202. Output signal 1218 acts as signal STW for LM B1202, so that when LMB 1202 receives output signal 1218 and clock signal $\phi_W$ the video data is sequentially written in LMB 1202. LMA 1201 and LMB 1202 cooperative function as line memories for storing the video data of 1H.

LMA 1201 and LMB 1202 both receive as inputs a start reading signal STR and clock signal $\phi_C$. When STR is generated, the video data is independently read out from each line memory LMA 1201, LMB 1202 in accordance with the control of clock signal $\phi_C$. The video data of the first half of 1H is read out from LMA 1201 and is transferred to multiplexer 1208 and field memory 1203 through data buses 1219 and 1220 respectively.

Field memory 1203 contains two field memories, FMA 1204 and FMB 1205, each storing one half field of video data. The video data of 1H is stored in the addresses n through n+319 of FMA 1204 and in the addresses n to n+319 of FMB 1205. The video data stored in LMA 1201 is input to FMA 1204 through data buses 1219 and 1221 and to MPXA through data bus 1219. The video data stored in FMA 1203 is output to multiplexer 1208 through data bus 1221. Similarly, the video data stored in LMB 1202 is input to FMB 1205 through data buses 1220 and 1222 and to MPXB through data bus 1220. The video data of FMB 1205 is output to multiplexer 1208 through data bus 1222.

An address counter (AC) 1207 designates the address of field memory 1203. AC 1207 designates the address of FMB 1205 and FMB 1204 at the same time. As in the first embodiment, AC 1207 is controlled by a gated signal produced by a AND gate 1240. Gate 1240 receives as its input clock signal $\phi_C$ and a control signal EN. When EN is "1", clock signal $\phi_C$ is supplied and the address information of AC 1207 is changed in accordance with clock signals $\phi_C$.

An address memory (AM) 1206 sets and stores the address information of AC 1207. The contents of AC 1207 is set in AM 1206 by an ADL signal through address bus 1224. Furthermore, the contents of AM 1206 is set in AC 1207 by an ADS signal through address bus 1223.

Multiplexer 1208 includes two multiplexers MPXA 1209 and MPXB 1210. MPXA 1209 controls data received from LMA 1201 and FMA 1204. Similarly, MPXB 1210 control data received from LMB 1202 and FMB 1205. When SL becomes "1", the video data of LMA 1201 and LMB 1202 are transferred by MPXA 1209, MPXB 1210 to signal driving circuit 1250 through respective data buses 1225, 1226. When SF becomes "1", the video data of FMA 1204 and the video data of FMB 1205 are transferred through MPXA 1209, MPXB 1210 to signal drive circuit 1210 through respective data buses 1225, 1226.

The signal drive circuit 1250 includes two signal driving circuits DDA 1211 and DDB 1212. The internal structures of DDA 1211 and DDB 1212 are the same as DD 107, however the number of columns of the shift register of each signal driving circuit, DDA 1211 and DDB 1212, has a line memory of only four bits by three hundred and twenty columns. The signal driving signal is generated in response to the inputted video signal data and input to a display 1215. Signal drive circuit 1250 is controlled by a gated signal from gate 1213 and control signal LP. In gate 1213, AND gate 1242 receives as a first input clock signal $\phi_C$ and as a second input the output of OR gate 1244, which receives SL and SF as inputs. Furthermore, the video data from MPXA 1209 and MPXB 1210 are input into DDA 1211 and DDB 1212 respectively.

A scanning driving circuit (SD) 1214 generates scanning driving signals for display 1215. The internal structure of SD 1214 is the same as that of SD 108.

Display 1215 is a liquid crystal display. Display 115 includes six hundred and forty picture elements forming columns in the horizontal direction and four hundred and forty picture elements forming rows or lines in the vertical direction.

Each of the control signals is supplied from a timing control (not shown) corresponding to TC 111.

Figure 13:
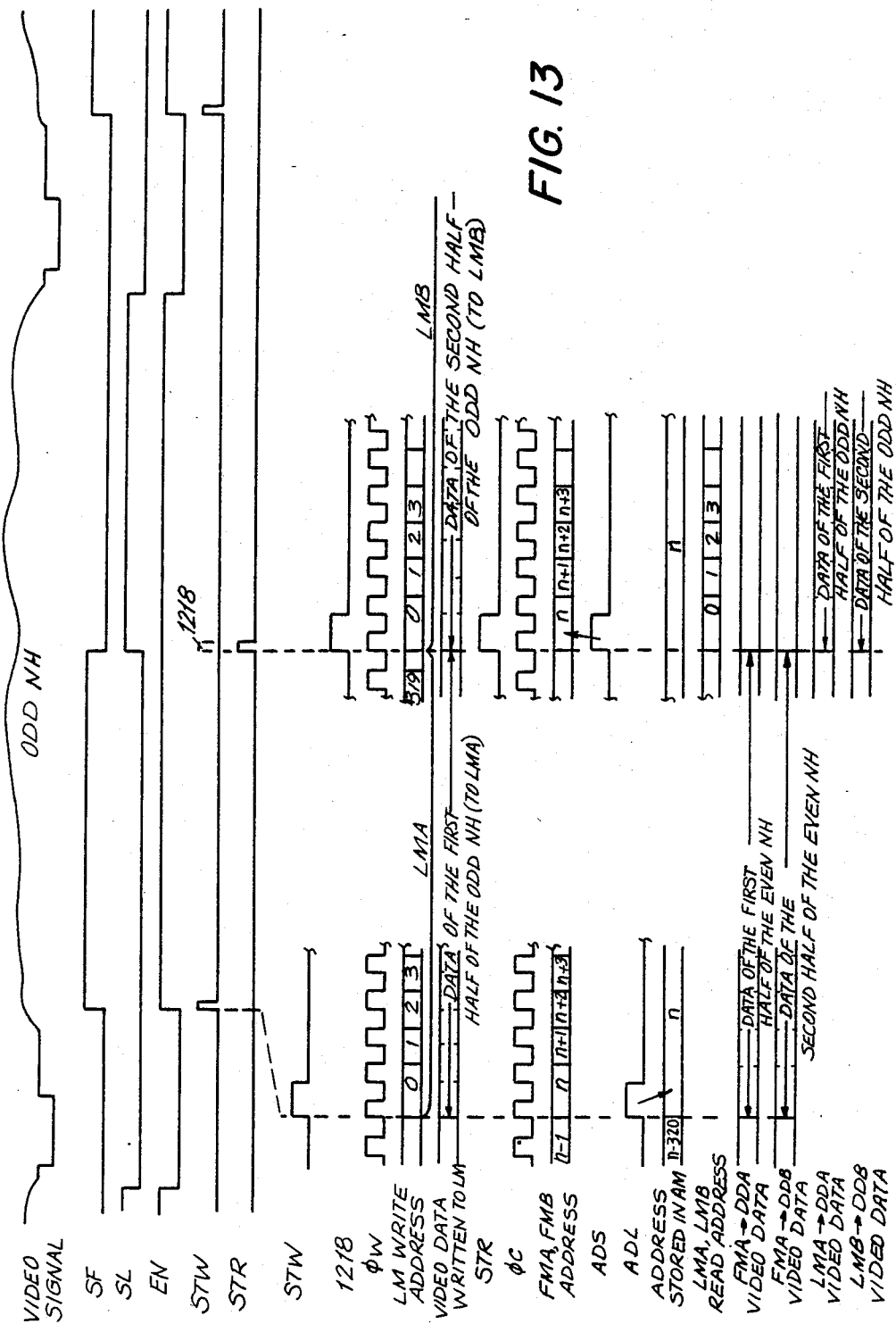
FIG. 13 is a timing chart in accordance with the video display system of FIG. 12.

Reference is now made to FIG. 13 in which a timing chart of NH odd field for illustrating the operation of video display system 1200 is provided. Signal SF is "1" during the first half of the horizontal period and signal SL is "1" during the second half of the horizontal period. When SF becomes "1", the video data of both FMA 1204 and FMB 1205 are transmitted to DDA 1211 and DDB 1212 respectively by MPX 1208. When SL becomes "1", the video data stored in LMA 1201 and LMB 1202 are transferred to DDA 1211 and DDB 1212 respectively.

When signal EN is "1", the clock signal $\phi_C$ is supplied to AC 1207. A start write signal STW is generated when SF becomes "1" and is input into LMA 1201. The write addresses of LMA 1201 are changed consecutively with clock signal $\phi_W$ and consequently the video data of the first half of the odd NH is written. When the address of LMA 1201 becomes equal to the last column the shift register of LMA 1201 signal 1218 is generated to begin writing data in LMB 1202. The generation of signal 1218 occurs when signal SL becomes "1".

In AC 1207, the contents of counter 1207, the addresses of field memory 1203, is changed from n to n+1, . . . , in accordance with clock signal $\phi_C$. The frequency of $\phi_C$ the same as that of $\phi_W$ so that three hundred and twenty addresses from n to n+319 are accessed until the signal SF becomes "0". As the addresses change, the video data corresponding to the first half of the even NH which is stored in the addresses of n to n+319 of FMA 1203 is transferred to DDA 1211. The video data of the second half of the even NH stored in the addresses n through n+319 of FMB 1204 is transferred to DDB 1212. Simultaneously, the contents of AC 1207, the addresses "n" is set in AM 1206 by signal ADL.

When signal SF and signal SL become "0" and "1", respectively, signal 1218 is generated from LMA 1201 beginning the writing of data in LMB 1202. The video data of the second half of the odd NH is sequentially written in LMB 1202. The contents of AM 1206 (addresses "n"), is again set in AC 1207 by ADL and the addresses n through n+319 of field memory 1208 are accessed.

To commence the reading of LMA 1201 and LMB 1202, read start signal STR is provided. The read start signal occurs simultaneously with clock signal $\phi_C$. The data is then read out in accordance with the address change as controlled by clock signal $\phi_C$. The frequency of $\phi_C$ is equal to that of $\phi_W$. The video data of the first half of the odd NH which is stored in LMA 1201 is transferred to the addresses n, n+1, . . . , n+319, of FMA 1204, and to DDA 1211. The video data of the second half of the odd NH in LMB 1202 is transferred to the addresses n, n+1, . . . , n+319, of FMB 1205, and to DDB 1212.

Signal driving circuit 1250 generates a signal driving signal in accordance with the video data transferred to DDA 1211 and DDB 1212. In the odd field, SD 1214 generates scanning signals alternating even and odd lines beginning with an even line, while in the even field, SD 1214 generates scanning signal in an alternating fashion beginning with an odd line.

In this embodiment, the line memory and the field memory are formed of two blocks corresponding to the first half and the second half of a 1H video signal. Therefore, the clock signal $\phi_C$ for reading out the video data from each video memory is the same as clock signal $\phi_W$. Their frequencies are equal and are represented by the formula fVC0/2=13.6 MHz. Thus, the value of fVC0/2 can be set in the first embodiment. Therefore, the consumption of power of the system as a whole can be reduced and a timing margin in the circuit design is advantageously increased.

In this embodiment, the video display is divided into two sections for reasons of example. The same concept for video memory may be divided into more than two sections. As disclosed in the previous embodiment, the video data may be let out from the video memory during the entire horizontal period, namely the entire Tc, thereby reducing the frequency of the reading out of the video data.

Figure 14:
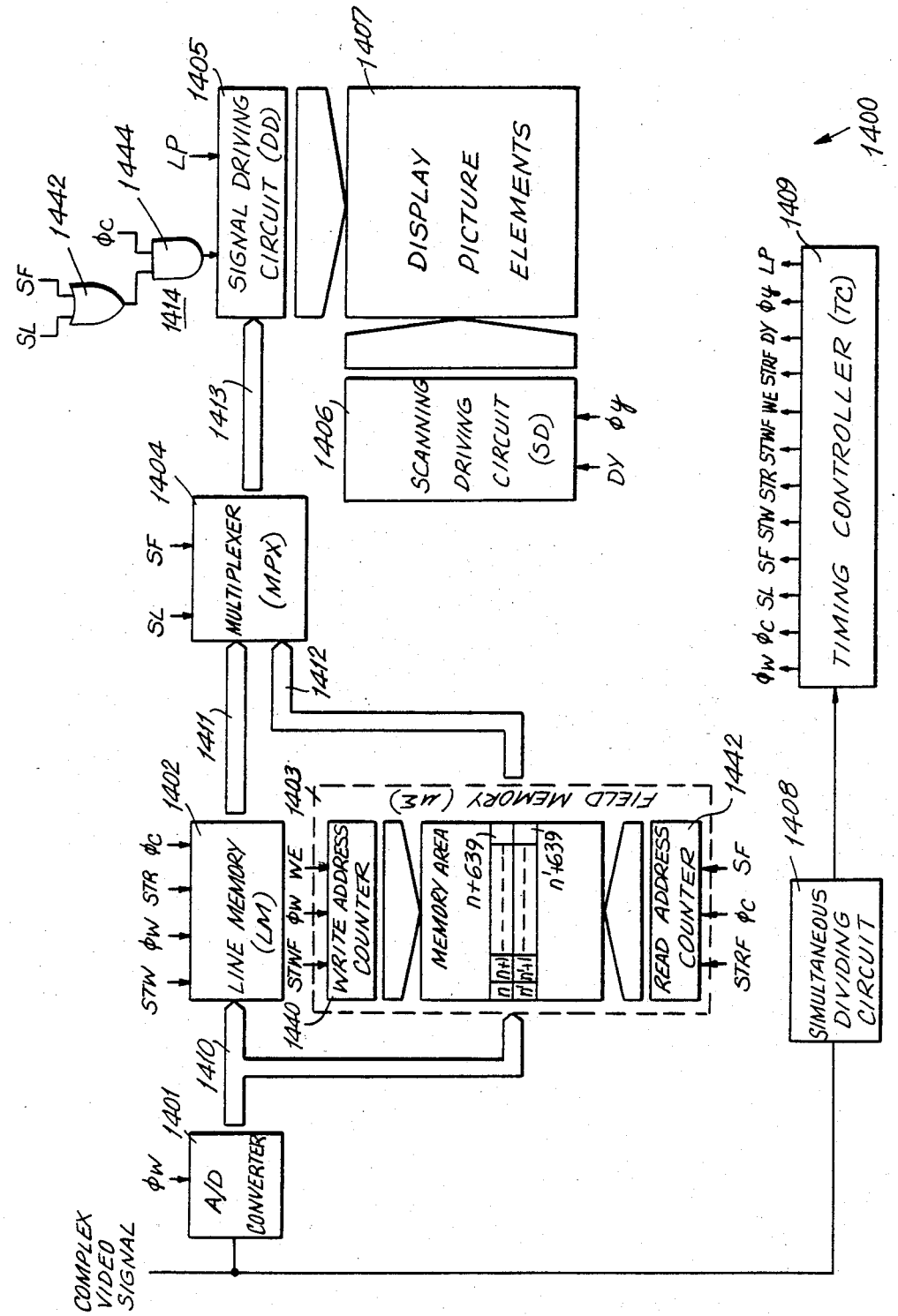
FIG. 14 is a block diagram of a third embodiment of a video display system in accordance with the present invention.

Reference is now made to FIG. 14 wherein a third embodiment of a video display system in accordance with the invention, generally indicated as 1400 is provided. An A/D converter 1401 receives an analog complex video signal and clock signal $\phi_W$ and converts the complex video signal from an analog signal to a digital signal. For example, when the video signal is sectioned into 16 gradations, A/D converter 1401 outputs a digital video data signal made up of four bit sections. The digital video data is transferred to line memory LM 1402 and to field memory FM 1403 through data bus 1410.

LM 1402 stores the video data 1H of one horizontal period and has the same construction as LM 102. LM 1402 receives signal STW to begin writing. The write address of LM 102 is shifted by clock signals $\phi_W$, allowing the video data 1H to be sequentially written. LM 1402 also receives a signal STR which begins the reading out of the data contained in LM 1402. The read address of LM 102 is shifted by clock signal $\phi_C$ resulting in the sequential reading out of the video data of 1H. The read video data is transferred from LM 1402 to MPX 1404 through data bus 1411.

FM 1403 stores the video data 1H through one field. A particular 1H video data is stored in the addresses n through n+639. Just as in video display system 100, display 1407 has six hundred and forty picture elements extending across the horizontal direction so that the video signal 1H may be regarded as video data being divided into six hundred and forty segments, so that the number of terms within signal 1H, B, is equal to six hundred and forty. A successive video data of 1H is stored in addresses n' through n'+639, where n' equals n+640. When the video data is written in FM 1403, video data 1H is transferred from A/D 1401 to FM 1403, through data bus 1410.

FM 1403 includes a write address counter 1440 and a read address counter 1442. Write address counter 1440 receives as an input a start write signal STW which begins the writing in FM 1403. The write address of FM 1403 is shifted by clock signals $\phi_W$ enabling the sequential writing of the video data 1H in FM 1403. Write address counter 1440 receives a control signal WE which controls the writing of the memory. When WE has a value of "1", the memory conducts the writing operation. When WE has a value of "0", the writing operation is halted and write address counter 1440 is also stopped.

Write start signal STWF exists during the first horizontal period of each field in which the video data is written. The timing of STWF is similar to that of write start signal STW of LM 1402.

Read address counter 1442 receives a read start signal STRF to begin reading out of the video data stored in FM 1403. The read address of FM 1403 is shifted by a clock signal $\phi_C$ and consequently the video data 1H is read out. The video data read from FM 1403 is transferred to MPX 1404 through data bus 1412. A signal SF controls the read operation of FM 1403. When SF has a value of "1", FM 1403 conducts the reading operation. When SF has a value of "0", the reading operation is prevented and read address counter 1442 is also stopped. The read start signal STRF exists at the first horizontal period of each field in which the video signal is read out. STRF is a pulse signal which rises simultaneously with SF.

In this embodiment, FM 1403 is again a first in-first out type of memory so that the reading of data can be independently and non-simultaneously conducted with the writing of data. This type of memory, may be, by any of example, a memory of TI Corporation, Model No. TMS4C1050NL.

MPX 1404 controls the output of video data from both LM 1402 and FM 1403 and selectively transfers the video data to DD 1405. MPX 1404 is controlled by control signals SL, SF. When SL has a value of "1", the video data of LM 1402 is selected and when SF has a value of "1", the video data of FM 1403 is selected. The video data from MPX 1404 is transferred to DD 1405 through data bus 1413.

DD 1405 generates signal driving signals to display 1407 in the column (horizontal) direction of display 1407 in response to the video data inputs from bus 1413. DD 1405 is controlled by gated signals output from a gate 1414. Gate 1414 includes an OR gate 1446 having inputs SL, SF and an AND gate 1444 having the output of gate 1446 and clock signal $\phi_C$ as its inputs. Since display 1407 has six hundred and forty picture elements across in the column direction, the number of output terminals of DD 1405 is six hundred and forty. The internal structure of DD 1405 is identical to DD 107.

SD 1406 generates scanning driving signals in the line (vertical) direction. SD 1406 is identical to SD 108.

A simultaneous dividing circuit 1408 divides the complex simultaneous signal from the complex video signal utilizing the amplitude dividing technique.

TC 1409 receives the simultaneous divided signal and forms the control signals $\phi_W$, $\phi_C$, SL, SF, STW, STR, STWF, WE, STRF, DY, $\phi_Y$ and LP. TC 1409 is similar to TC 111. However, the horizontal direction control signal of display 1407 output from timing circuit 609 is different from that of the control signal of TC 111.

Figure 15:
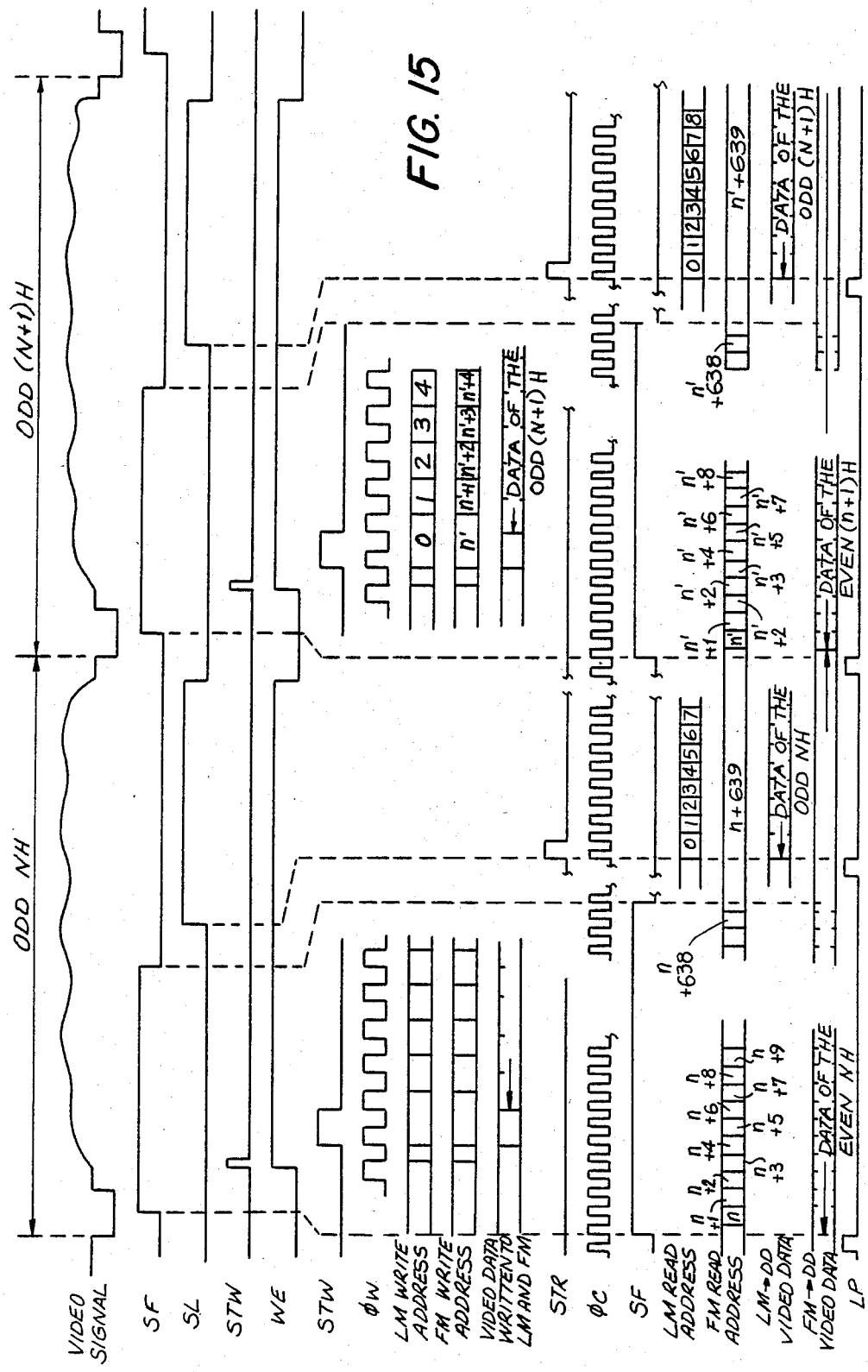
FIG. 15 is a timing chart for the video display system of FIG. 14.

Reference is now made to FIGS. 15, 16 and 9 in which the operation of video display system 1400 is illustrated. FIG. 15 is a timing chart for the NH and the (N+1)H of the odd field. Signal SF becomes "1" during the first half of the horizontal period while SL becomes "1" during the second half of the horizontal period. When SF has a value of "1", MPX 1404 selects the video data read out from FM 1403 along bus 1412. When SL has a value of "1", MPX 1404 selects the video data read out from LM 1402 along bus 1411. The video data is then transferred to DD 1405.

Signal STW has a width equal to one period of clock signal $\phi_W$ and exists at the starting point of the effective video signal term of each horizontal period. Signal STR has a width equal to one period of clock signal $\phi_C$ and rises simultaneously with SL. Signal STWF exists as the first horizontal term of the odd and even fields. The timing of signal STWF is the same as that of signal STW. STRF exists as each first horizontal term of the odd and even fields and rises simultaneously with signal SF. Signal STRF has a width equal to one period of clock signal $\phi_C$.

The lower portion of FIG. 15 is an enlarged view of the time axis. In the odd NH, the writing shift register 201 of LM 1402 is started when STW becomes "1" and the write address of LM shifts simultaneously with clock signal $\phi_W$. At the same time, the video data of the odd NH is sequentially written in LM 1402. Additionally, when the control signal for writing in FM 1403, WE, becomes "1", the write address of FM 1403 shifts to address 640, in each horizontal term, simultaneously with clock signal $\phi_W$.

For example, during the odd NH, the address counter increases from address n to address n+639 and the video data is written in the appropriate corresponding address simultaneously with shifting in accordance with the clock signal $\phi_W$. During the first half of each horizontal period, the read address of FM 1403 is increased simultaneously with clock signal $\phi_C$ to the address 640 during each period in which SF has a value of "1".

The reading of data in FM 1403 is followed by the writing of data in FM 1403. For example, during the odd NH, the address counter is sequentially increased from the address n through the address n+639. The video data of the even NH immediately preceeding by one field the present odd NH is read out of each corresponding address simultaneously with address shifting in accordance with clock signal $\phi_C$. This video data is transferred to DD 1405 through data bus 1413. Subsequently, during the second half of each horizontal period, SL becomes "1" and shift register 203 for reading data into LM 1402 begins operation in accordance with signal STR becoming "1". The read address of LM 1402 shifts simultaneously with clock signal $\phi_C$. The video data of the horizontal period is thus read out in correspondence with the change of each address and then transferred to DD 1405.

Write start signal STWF and read start signal STRF of FM 1403 are not shown on the time chart, however, they exist as the first horizontal term of the odd and even fields. The timing of STWF is the same as that of STW. STRF rises simultaneously with SF. STWF is a pulse signal having a width equal to one period of clock signal $\phi_C$. Additionally, reading of data in FM 1403 must be followed by writing of data into FM 1403. During operation of this embodiment, SF rises at an intermediate point of the horizontal term of the video signal. However, since the frequency of clock signal $\phi_C$ is twice that of clock signal $w$, the reading of data is always followed by the writing of data even if reading of the data is started at the same time as writing of the data. Therefore, even if the timing of the rise SF is the same as the timing of the write start signal STW as shown in FIG. 7 the system still operates.

Similarly, the video data of the horizontal period is written in LM 1402 and FM 1403 respectively in the odd (N+1)H. The write address of FM 1403 is increased from the address n' to the address n'+639 where n' equals n+640. During the first half of the horizontal period, when SF has a value of "1", the write address of FM is increased from n' to n'+639. The previously written video data of the previously preceeding even field (N+1)H, written in each address of FM 1403, is transferred to DD 1405. During the second half of the horizontal period, when SL has a value of "1", the video data of the horizontal term, written in LM 1402 is read out and transferred to DD 1405.

In timing chart FIG. 15, odd NH may be replaced with the even NH to represent the operation of the even fields.

In the timing chart of FIG. 16, k is equal to six hundred and forty. Video data 1H of the odd NH field is written in LM 1402. The write address of LM 1402 is accessed from address 0 to address 160. Similar accessing of addresses is conducted during the other horizontal periods. The data is read out of LM 1402 during the second half of the odd NH. The data of the odd NH is read out and transferred to DD 1405. In LM 1402 writing of data is followed by reading of data.

In the odd NH, the video data of the odd NH is written in 1H of FM 1403. The write address of FM 1403 is accessed from n through n+k−1, where n+k−1 equals n+639. Prior to the writing of data, the reading of data starts at the beginning of the odd NH. During the first half of the odd NH the read address is accessed from n through n+k−1 and the previously written data of the even NH which preceeds the odd NH by one field, is read out. The other horizontal term is treated in a similar manner. Reading data of the horizontal period is followed by writing data. The data of the horizontal period of the even field which preceeds the odd field is read out and transferred to DD 1405. Therefore, in FM 1403, the reading of data is followed by the writing of data.

The video data transferred to DD 1405 is introduced into a shift register 301 then introduced to line memory 302 in response to control signal LP. Therefore, the output of the signal driving signal produced in response to the video data of the even NH and the odd NH is delayed by about one half compared with the period of transferring the video data to DD 1405.

Additionally, SD 1406 generates the scanning driving signal in the order of $Y_{en-1}$, $Y_{on-1}$, $Y_{en}$ and $Y_{on}$. Therefore, a correct video display may be obtained by compensating the video data of the odd field by the video data of the preceeding even field even in the odd field of display 1407. Similarly, in the even field, SD 1406 generates the scanning driving signal in the order of $Y_{on-1}$, $Y_{en-1}$, $Y_{on}$, $Y_{en}$ so that a correct video display may be obtained by compensating the video data of the even field by the previously preceeding odd field even in the even field of display 1407.

Figure 17:
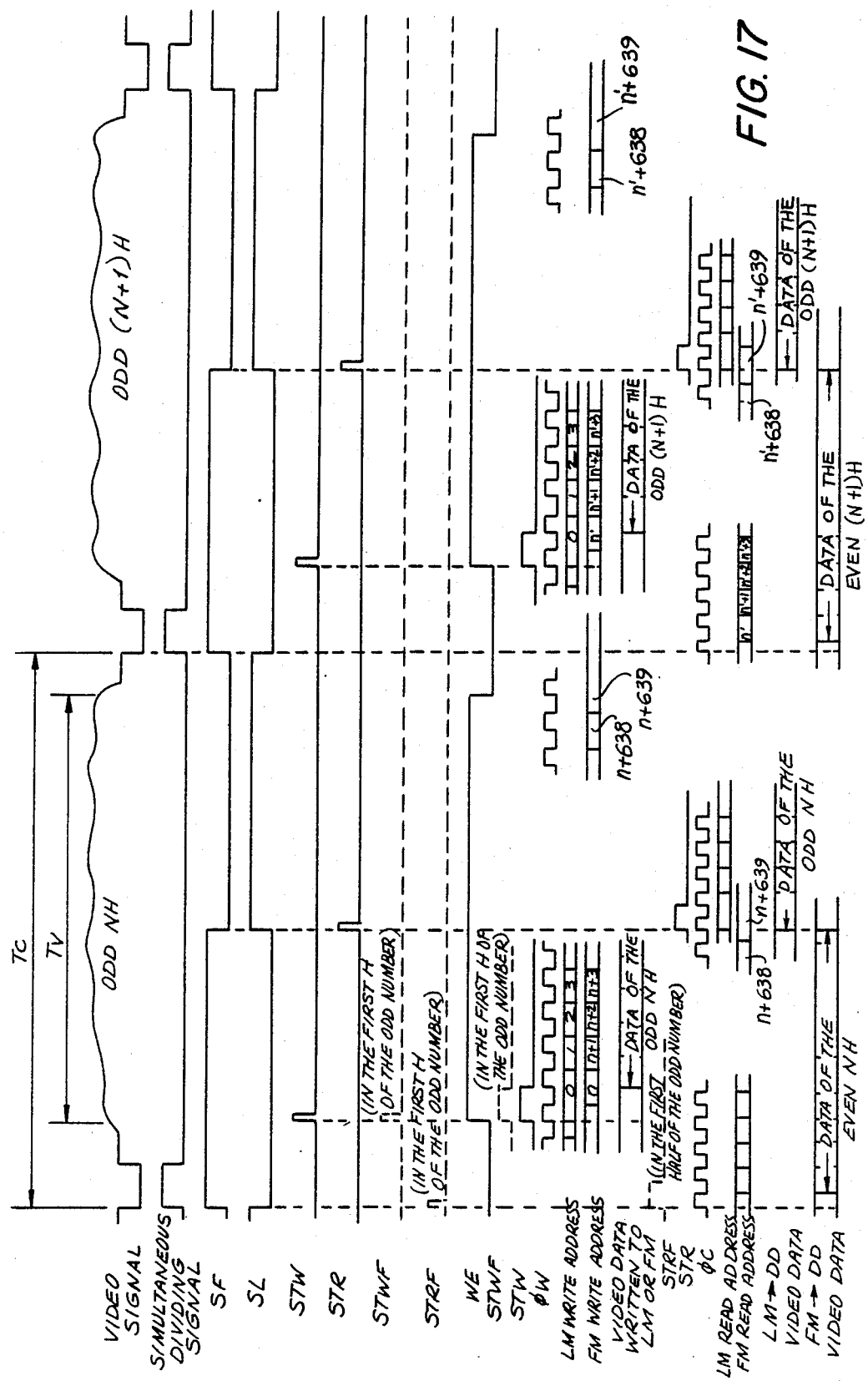
FIG. 17 is an alternate timing chart for the video display system of FIG. 14 and the timing controller of FIG. 10.

Reference is now made to FIG. 17 wherein a timing chart for a video display system similar to video display system 1400 is provided. The system of FIG. 17 is structurally the same as video display system 1400, however, the timing controller 1409 is replaced by a timing controller similar to TCF 1000. Additionally, signal ADL becomes signal STRF and there is no signal ADS.

As in the timing charts above, signal SF becomes "1" during the first half of the horizontal period of the odd NH while SL becomes "1" during the second half of the horizontal period. When SF has a value of "1", the video data from FM 1403 is read out and transferred to DD 1405. When SL has a value of "1", the video data from LM 1402 is read out and transferred to DD 1405.

Video data is written in LM 1402 in a manner similar to that of video display system 1400 and the timing chart of FIG. 15. A start write signal STW and clock signal $\phi_W$ causes shift register 201 of LM 1402 to begin writing in each successive address of LM 1402.

The video data is written in FM 1403 upon receipt of a start signal STWF, clock signal $\phi_W$ and control signal WE. The writing operation is begun upon receipt of STWF which exists in the first horizontal term of each field. The video data is written in FM 1403 simultaneously with clock signal $\phi_W$. However, the video data may only be written during the period in which WE is equivalent to "1".

Reading of the video data occurs when SF becomes "1" simultaneously with the rise of simultaneous dividing signal. The video data from FM 1402 is selected by MPX 1404. The reading operation occurs during the period in which SF has a value of "1". The reading operation starts when pulse signals STRF, having a width equal to one term of clock signal $\phi_C$, rises simultaneously with SF. Therefore, the start point for reading the video data occurs at the first horizontal term of each field. The address of read address counter 1442 changes with clock signal $\phi_C$ and the even NH data stored in the addresses n, n+1, ..., n+639, is read out. When 640 pulses of clock signal $\phi_C$ have been counted, Tc/2 after the rising of the simultaneous dividing signal, SF becomes "0" and SL becomes "1". The operation for reading LM 1402 is started by the pulse signal STR simultaneously with the rising of SL. Pulse signal STR has a width equal to one period of clock signal $\phi_C$. The video data of the odd NH is then read out simultaneously with clock signal $\phi_C$.

Similarly, in the odd (N+1)H during the first half of the horizontal period Tc, the video data of the even (N+1)H stored in FM 1402 is transferred to DD 1405. The video data of the even (N+1)H is stored in addresses n' through n'+639, wherein n' equals n+640. During the second half of the horizontal period Tc, the video data of the odd (N+1)H stored in LM 1402 is transferred to DD 1405. The above video data is transferred to DD 1405 in accordance with the timing of clock signal $\phi_C$.

Since clock signal $\phi_C$ has a frequency of 20.1 MHz, as described in connection with FIG. 10, the frequency is lower than clock signal $\phi_C$ of video display system 1400 which has a frequency of about 27.2 MHz. Therefore, the power consumption of the entire system is reduced. Additionally, the design margin is expanded.

In this example, an integer C is again equivalent to B. If the positive number C is equal to or greater than B, and Tc/2C is greater than Tv/2B, wherein Tc is the period of the complex video signal, Tv is the period of the video signal within Tc and B stands for the number of picture elements which exist in display 1407 across the horizontal direction, the video data can be read out of the video memory at the lowest possible frequency.

Figure 18:
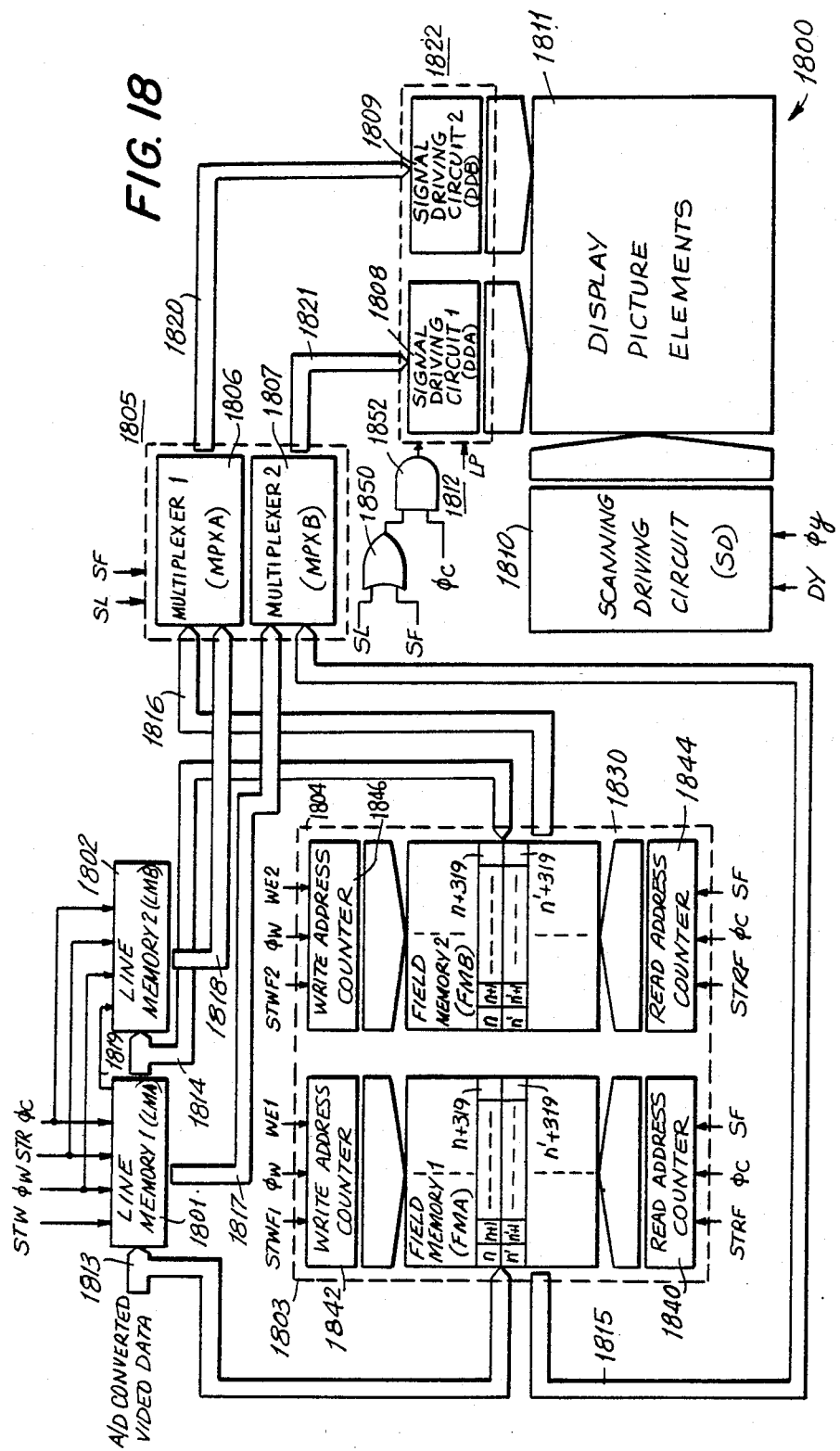
FIG. 18 is a block diagram of a fourth embodiment of a video display system in accordance with the invention.

Reference is now made to FIG. 18 wherein an alternative embodiment of the video display system, generally indicated as 1800, is depicted. The A/D converted video data is transmitted through an address bus 1813 to a first line memory LMA 1801. The video data is input to a second line memory LMB 1802 through data bus 1814. Each line memory has a capacity of four bits per word by three hundred and twenty words when the video data is broken into four bit segments. LMA 1801 stores the first half of video data 1H. LMB 1802 stores the second half of video data 1H. LMA 1801 and LMB 1802 have the same structure as LM 102.

LMA 1801 receives a start write signal STW which begins the writing of data in LMA 1801 and acts as a shift data signal for internal shift register 201. The video data is sequentially written in LMA 1801 in accordance with clock signal $\phi_W$. An output 1819 of LMA 1801 which is the output of the final column of shift register 201 is input into LMB 1802 and acts as the shift data signal of internal shift register 201 of LMB 1802. When output 1819 is generated, the video data is then sequentially written in LMB 1802. In this fashion, both LMA 1801 and LMB 1802 function together as the line memory for storing video data 1H.

A start read signal STR begins the reading process for reading out data of both LMA 1801 and LMB 1802. When STR is generated, the video data is individually read out of each line memory in accordance with clock signal $\phi_C$. The first half of video data 1H, which is read out of LMA 1801, is transferred to an MPX 1805 through a data bus 1817. The second half of the video data 1H which is read out of LMB 1802, is transferred to MPX 1805 through a data bus 1818.

A field memory 1830 includes two distinct field memories FMA 1803 and FMB 1804. Each field memory has the capacity for storing one half field and has the same basic internal structure as FM 1403. However, FMA 1803 is controlled by a write address counter 1842 and a read address counter 1840, while FMB 1804 is controlled by a separate write address counter 1846 and read address counter 1844.

The A/D converted video data is input to FMA 1803 through a data bus 1813. The A/D converted video data is input to FMB 1804 through a data bus 1814. A signal STWF1 begins the writing operation of FMA 1803 and a signal STWF2 begins the writing operation in FMB 1804. Both signals exist as the first horizontal term of each field. When STWF1 is generated during the first half of video data 1H, the writing operation is begun for FMA 1803. The video data is written simultaneously with clock signal $\phi_W$. The writing operation is carried out during the period in which a control signal WE1 has a value of "1". WE1 becomes "1" during the first half of each horizontal period, so that the video data of the first half of each horizontal period is written in FMA 1803. STWF2 is generated during the second half of video data 1H of each field so that the writing operation for the second half of video data 1H is started. Again, the video data is written simultaneously with clock signal $\phi_W$. The writing operation is only carried out during the period in which the control signal WE2 has a value of "1". Since WE2 becomes "1" during the second half of each horizontal period, the video data of the second half of each horizontal period is written in FMB 1804. Therefore, through the combination of both the addresses n through n+319 of FMA 1803 and the addresses n through n+319 of FMB 1804, video data 1H is stored.

Reading the data from FMA 1803 and FMB 1804 begins upon the receipt of start read signal STRF. STRF exists as the first horizontal term of each field and rises simultaneously with SF. STRF has the same width as one period of clock signal $\phi_C$. When signal STRF is generated, the video data is independently read from each field memory in accordance with the switching of the memory address in accordance with clock signal $\phi_C$. The reading operation is carried out during the term in which SF has a value of "1". The first half of video data 1H, which is read out from FMA 1803 is transferred to MPX 1805 through data bus 1815. The second half of video data 1H, which is read out from FMB 1804, is transferred to MPX 1805 through data bus 1816.

MPX 1805 includes two multiplexers MPXA 1806, MPXB 1807. MPXA 1806 corresponds to LMB 1802 and FMB 1804. MPXB 1807 corresponds to LMA 1801 and FMA 1803. When SL has a value "1", the video data of LMA 1801 and LMB 1802 are transferred to a signal driving circuit 1822 through data bus 1820 and 1821. When SF has a value of "1", the video data of FMA 1803 and FMB 1804 is transferred to signal driving circuit 1822 through data bus 1820 and 1821.

Signal driving circuit 1822 includes a first signal driving circuit (DDA) 1808 and second signal driving circuit (DDB) 1809. The internal structures of DDA 1808 and DDB 1809 are similar to DD 107. DD 1822 is controlled by a gated signal from a gate 1812 and a control signal LP. Gate 1812 includes an OR gate 1850 having as its input SF and SL and an AND gate 1852 having as its input the output of gate 1850 and clock signal $\phi_C$. The output of gate 1812 is the output of gate 1852. The column size for each signal driving circuit of both the internal shift register and the line memory is only four bits by three hundred and twenty columns. As mentioned above, the signal driving circuit 1822 generates the driving signal for display 1811 based upon the input video signal data. Additionally, the video data from MPXA 1806 and the video data from MPXB 1807 are input to DDA 1808 and DDB 1809 respectively.

SD 1810 generates the scanning driving signal for display 1811. The internal structure of SD 1810 is the same as SD 108.

Display 1811 is a liquid crystal display and comprises six hundred and forty picture elements in the horizontal direction and four hundred and forty picture elements in the vertical direction.

Each control signal for video display system 1800 is supplied by a time controller identical to TC 1409.

Figure 19:
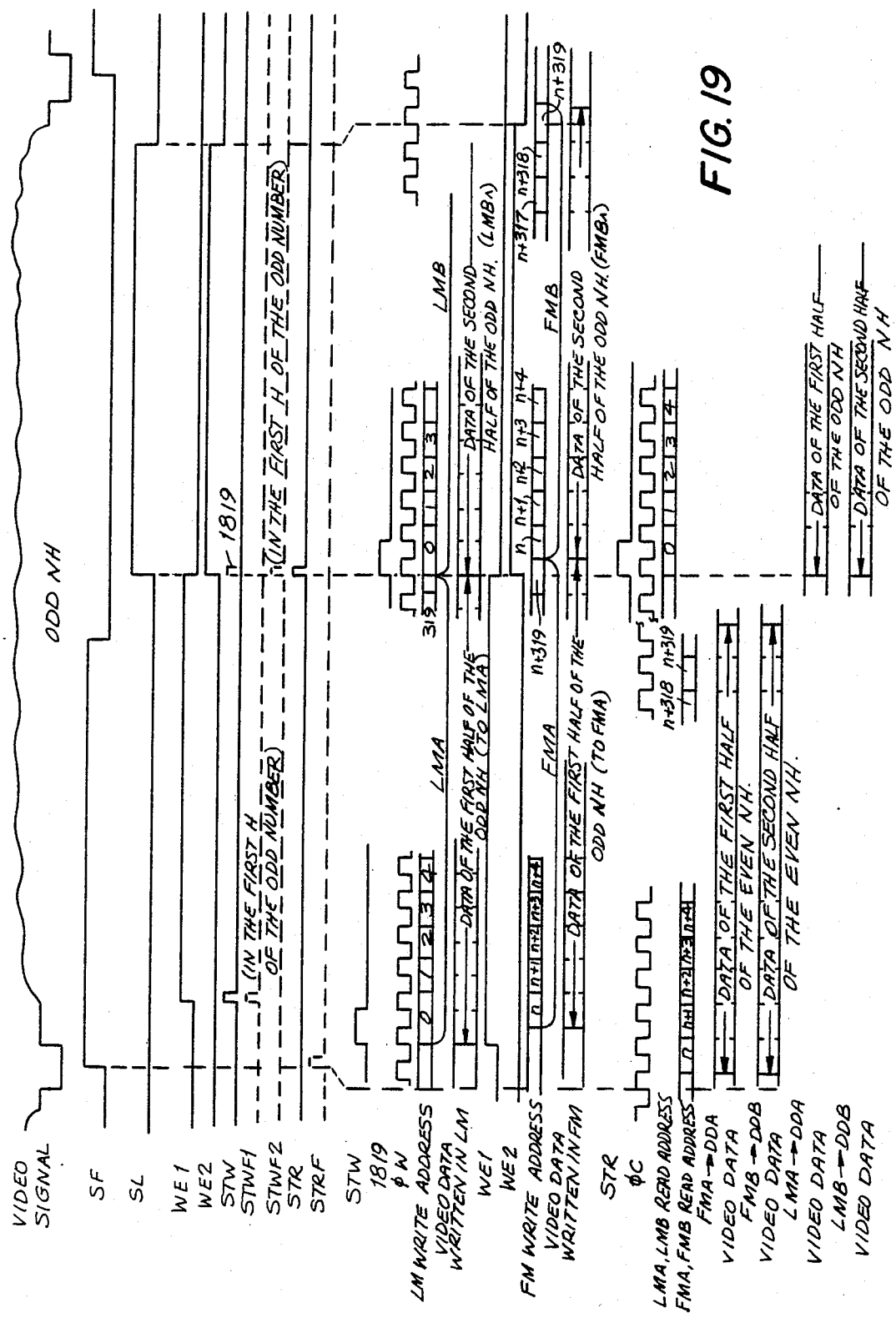
FIG. 19 is a timing chart for the video display system of FIG. 18.

Reference is now made to FIG. 19 wherein a timing chart for NH of the odd field is provided. SF has a value "1" during the first half of the horizontal period while SL becomes "1" during the second half of the horizontal period. When SF has a value of "1" MPX 1805 selects the video data of FMA 1803 and FMB 1804. The video data of FMA 1803 and FMB 1804 are transferred to DDA 1808 and DDB 1809 respectively. When SL has a value of "1", MPX 1805 transfers the video data of LMA 1801 and LMB 1802 to DDA 1808 and DDB 1809 respectively.

Start write signal STW begins the writing operation for the video data in LMA 1801. The video data of the first half of the odd NH is sequentially written in LMA 1801 simultaneously with clock signal $\phi_W$. Output 1819, generated from the last column of the shift register of LMA 1801 is generated to begin the writing operation for the video data of LMB 1802. Output 1819 rises simultaneously with SL. The video data of the second half of the odd NH is written in LMB 1802 simultaneously with clock signal $\phi_W$.

The video data of LMA 1801 is read out independently from the video data of LMB 1802. Start read signal STR rises simultaneously with SL and has a width equal to one period of clock signal $\phi_C$. The read operation is started by STR and the video data is read out simultaneously with clock signal $\phi_C$. The video data read out of LMA 1801 is transferred to DDA 1808 by MPXB 1807. The operation for writing the video data into FMA 1803 begins with write start signal STWF1. The video data of the first half of the odd NH is written in the addresses n through n+319 of FMA 1803 simultaneously with clock signal $\phi_W$. The writing operation is carried out during the period in which WE1 has a value of "1". STWF1 exists as the first horizontal term of each field. The timing of STWF1 is the same as the signal STW for starting the writing of the video data into LMA 1801. The operation for writing the video data into FMB 1804 begins with start write signal STWF2. The video data of the second half of the odd NH is written in the addresses n through n+319 simultaneously with clock signal $\phi_W$. The operation is carried out during the term in which WE2 has a value of "1". STWF2 is the first horizontal term of each field. The timing of STWF2 is the same as that of output 1819 of the shift register of LMA 1801. As mentioned above, WE1 has a value of "1" during the first half of each horizontal period while WE2 has a value of "1" during the second half of each horizontal period. Therefore, the video data of the first half of each horizontal period is written in FMA 1803 while the video data of the second half of each horizontal period is written in FMB 1804.

The video data of FMA 1803 is read out independently of the video data from FMB 1804. The reading operation begins with read start signal STRF causing the video data of the first half of the even NH which occurred one field prior to the odd NH is read out of FMA 1803. The video data of the second half of the even NH which occurred one field prior to the odd NH is read out of FMB 1804. The video data read out of FMA 1803 is transferred to DDA 1808 and the video data read out of FMB 1804 is transferred to DDB 1809. The reading operation of the video data is carried out during the term in which SF has a value of "1". Read start signal STRF exists as the first horizontal term of each field and has the same width as one period of clock signal $\phi_C$. STRF rises simultaneously with SF.

In response to the video data transferred to DDA 1808 and DDB 1809, a signal driving signal is generated by signal driving circuit 1822. The scanning driving signal is generated from SD 1810 in alternating order beginning with the even line in the odd field and beginning with the odd line in the even field.

In this example, the line memory and the field memory comprise two memory blocks corresponding to a first half and second half of the video signal 1H. Therefore, the clock signal $\phi_C$ for reading the video data from each video memory has the same frequency as clock signal $\phi_W$; fVCO/2=13.6 MHz, thus simplifying the circuit structure. However, the frequency of clock signal $\phi_C$ is now half that of the clock signal frequency of clock signal $\phi_C$ in video display system 1400. Accordingly, the consumption of power to the system may be further reduced. Again, the timing margin in the circuit design is expanded.

Also, in this example a video memory is divided in two pieces. Similarly, the video display can be divided into a plurality of pieces, thus reducing the frequency of the video data further.

As mentioned above, with the memory structure of the present invention, the video data of one horizontal period is written in the line memory. During the first half of the horizontal period, the next previous field of video data of the horizontal period, which is stored in the field memory both before and after the occurrence of the horizontal period is read out. During the second half of the horizontal period, the video data of the horizontal term, stored in the line memory is read out and written in the field memory. Accordingly, the video data of the horizontal period is written in both the line memory and the field memory. In the odd field, a scanning driving circuit generates a scanning driving signal in alternating order beginning with the even line. In the even field, the scanning driving circuit generates the scanning driving signal in an alternating order beginning with the odd line. By the above driving method a non-interlace display can be obtained by dividing the interlace video signal into an odd field and even field utilizing a line memory and a field memory. This driving method greatly improves the efficiency of the video memory over the conventional driving method. Furthermore, the frequency for replacing the image is 60 Hz, so that there is no image flickering even when a liquid crystal display is used.

The period for reading out the video data of one horizontal period on the line memory and the field memory is set as one whole horizontal period of a complex video signal including the horizontal blanking term. Additionally, each memory is divided into a plurality of blocks and when the video data is written in time series and the video data is read out in parallel from each block, so the clock frequency for reading the video data can be reduced in inverse proportion to the divided block number. Therefore, the power consumption for the system can be reduced since the frequency of the read clock signal can be reduced. The design margin for the functional delay due to the circuit elements expands since the frequency is reduced. The signal frequency relating to the transfer of the read video data to the signal driving circuit may be reduced according to the present invention, therefore reducing power consumption and increasing the design margin of the video display system.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A video display method for driving a liquid crystal display for an interlaced video signal system having a line memory for storing one horizontal period of video data of a complex video signal, a field memory for storing one field of video data, a signal driving circuit for generating signal driving signals in response to the video data transferred from either the line memory or the field memory and a scanning driving circuit for generating scanning driving signals for a display in which the video signal is divided into an odd and even field comprising the following steps:

sequentially writing the video data of one horizontal period of the video signal in the line memory;

during the first half of the horizontal period of the video signal, transferring the video data of the previous field, which has been stored before and after the present horizontal period to the signal driving circuit; and during the second half of the horizontal period, transferring the video data stored in the line memory to the signal driving circuit.

2. The video display and method of claim 1, wherein in the odd field the scanning driving signals are generated in an alternating line pattern beginning with an even line and in the even field are generated in an alternating line pattern beginning with an odd line.

3. The video display method of claim 1, further including the step of, during the second half of the horizontal period, transferring the video data of the horizontal period which is stored in the line memory to the region of the field memory from which the video data was transferred during the first half of the horizontal period.

4. The video display method of claim 2, further including the step of, during the second half of the horizontal period, transferring the video data of the horizontal period which is stored in the line memory to the region of the field memory from which the video data was transferred during the first half of the horizontal period.

5. The video display method of claim 1, further comprising the step of writing the video data of the video signal of one horizontal period in the region of the field memory from which the video data was transferred and wherein the operation for transferring the video data stored in the field memory to the signal driving circuit precedes the operation for writing the video data in the field memory.

6. The video display method of claim 2, further comprising the step of writing the video data of the video signal of one horizontal period in the region of the field memory from which video data was transferred and wherein the operation for transferring the video data stored in the field memory to the signal driving circuit precedes the operation for writing the video data in the field memory.

7. The video display method of claim 1, further comprising the steps of dividing the video data of one horizontal period into a plurality of groups;
dividing a line memory and/or the field memory into a plurality of memory blocks corresponding to the plurality of groups of the video data;
the individual memory blocks being connected in series wherein the video data is written into the line memory and the field memory in series; and
reading the video data from the individual blocks in parallel.

8. The video display method of claim 2, further comprising the steps of dividing the video data of one horizontal period into a plurality of groups;
dividing a line memory and/or the field memory into a plurality of memory blocks corresponding to the plurality of groups of the video data;
the individual memory blocks being connected in series wherein the video data is written into the line memory and the field memory in series; and
reading the video data from the individual blocks in parallel.

9. The video display method of claim 3, further comprising the steps of dividing the video data of one horizontal period into a plurality of groups;
dividing a line memory and/or the field memory into a plurality of memory blocks corresponding to the plurality of groups of the video data;
the individual memory blocks being connected in series wherein the video data is written into the line memory and the field memory in series; and
reading the video data from the individual blocks in parallel.

10. The video display method of claim 6, further comprising the steps of dividing the video data of one horizontal period into a plurality of groups;
dividing a line memory and/or the field memory into a plurality of memory blocks corresponding to the plurality of groups of the video data;
the individual memory blocks being connected in series wherein the video data is written into the line memory and the field memory in series; and
reading the video data from the individual blocks in parallel.

11. The video display method of claim 1, further comprising the steps of writing the video data of a video signal period Tv into the line memory or field memory every Tv/B; reading the video data of one video signal period Tv from said line memory or said field memory every Tc/2C in one period Tc of the complex video signal wherein B is a positive integer equal to the number of picture elements across the display in the horizontal direction, C is a positive figure greater than or equal to B, and Tc/2C is greater than Tv/2B.

12. The video display method of claim 2, further comprising the steps of writing the video data of a video signal period Tv into the line memory or field memory every Tv/B; reading the video data of one video signal period Tv from said line memory or said field memory every Tc/2C in one period Tc of the complex video signal wherein B is a positive integer equal to the number of picture elements across the display in the horizontal direction, C is a positive figure greater than or equal to B, and Tc/2C is greater than Tv/2B.

13. The video display method of claim 6, further comprising the steps of writing the video data of a video signal period Tv into the line memory or field memory every Tv/B; reading the video data of one video signal period Tv from said line memory or said field memory every Tc/2C in one period Tc of the complex video signal wherein B is a positive integer equal to the number of picture elements across the display in the horizontal direction, C is a positive figure than or equal to B, and Tc/2C is greater than Tv/2B.

14. The video display method of claim 7, further comprising the steps of writing the video data of a video signal period Tv into the line memory or field memory every Tv/B; reading the video data of one video signal period Tv from said line memory or said field memory every Tc/2C in one period Tc of the complex video signal wherein B is a positive integer equal to the number of picture elements across the display in the horizontal direction, C is a positive figure greater than or equal to B, and Tc/2C is greater than Tv/2B.

15. A video display for displaying on a liquid crystal display a complex video signal divided into an odd field and even field and having a plurality of horizontal signal periods, comprising:
line memory means for serially writing the video data of one horizontal signal period of the video signal in the first half of the horizontal period;
field memory means for storing the preceeding odd and even fields and for serially reading a stored line of video data of the video signal during the first half of the horizontal period, and writing the line of video data read from the line memory means during the second half of the horizontal period;
signal driving means for serially receiving the video data signals from the line memory means and field memory means and generating a parallel driving signal for application to the liquid crystal display; and
multiplexer means for selectively transmitting either the video data written in the line memory means or the video data written in the field memory means to the signal driving means.

16. The video display of claim 15, wherein the line read from the field memory means is the next preceeding line to the line written in the line memory means and from the opposite field.

17. The video display of claim 15 further comprising the scanning driving means for generating scanning driving signals in lines across each column of the liquid crystal display, the scanning driving signals being generated in an alternating sequence of odd and even lines beginning with an even line in the odd field and beginning with an odd line in the even field.

18. The video display of claim 15, further comprising controller means for receiving a divided simultaneous video signal and producing a first clock signal, a second clock signal, a start read signal and a start write signal.

19. The video display of claim 18, wherein the field memory means further comprises an address counter for receiving the second clock signal and causing the video data stored in the field memory to read out from each address, as the address counter changes each address in accordance with the second clock signal.

20. The video display of claim 18, wherein the video data is written in the line memory means in response to the start write signal.

21. The timing control signal of claim 17, wherein the video data is read out from the line memory means in response to the start read signal.

22. The video display of claim 17, wherein the line memory means is divided into at least two line memories of equal capacity, each line memory storing equal portions of the video data of one horizontal signal period of the video signal, the video data being sequentially read into the successive line memories.

23. The video display of claim 22, wherein each line memory before the last produces a signal when full and the next line memory receives the signal and begins to write video data of the horizontal signal period upon receipt of the signal from the prior line memory.

24. The video display of claim 23, wherein the field memory means is divided into at least a first field memory and a second field memory of equal capacity for storing equal portions of the video field in each period.

25. The video display of claim 24, wherein the multiplexer means comprises at least a first multiplexer and a second multiplexer, the first multiplexer selectively transmitting the video data stored within the first line memory and the first field memory to the signal driving circuit and the second multiplexer means transmitting the video data of the second line memory means and the second field memory means to the signal driving means.

26. The video display of claim 24, wherein the multiplexer means includes at least a first multiplexer and a second multiplexer, the first multiplexer selectively transmitting the video data of the second line memory and the second field memory to the signal driving circuit and the second multiplexer selectively transmitting the video data of the first line memory and a first field memory to the signal driving circuit.

* * * * *